United States Patent [19]

Bates et al.

[11] Patent Number: 5,958,999
[45] Date of Patent: *Sep. 28, 1999

[54] INK COMPOSITIONS AND METHOD FOR GENERATING IMAGES PRODUCED THEREFROM

[75] Inventors: Jodi A. Bates, Billerica; James A. Belmont, Acton, both of Mass.; Joseph E. Johnson, Nashua, N.H.; John C. Smith, Houston, Tex.

[73] Assignee: Cabot Corporation, Boston, Mass.

[*] Notice: This patent is subject to a terminal disclaimer.

[21] Appl. No.: 08/628,202

[22] Filed: Apr. 5, 1996

[51] Int. Cl.⁶ ........................................... C08K 3/00
[52] U.S. Cl. .......................... 523/161; 524/495; 524/496
[58] Field of Search ........................... 523/161; 524/495, 524/496

[56] References Cited

U.S. PATENT DOCUMENTS

| | | | |
|---|---|---|---|
| T860,001 | 3/1969 | Gessler . | |
| 2,121,535 | 6/1938 | Amon | 106/473 |
| 2,156,591 | 5/1939 | Jacobson | 106/475 |
| 2,439,442 | 4/1948 | Amon et al. | 23/209.1 |
| 2,502,254 | 3/1950 | Glassman | 106/476 |
| 2,514,236 | 7/1950 | Glassman | 106/476 |
| 2,625,492 | 1/1953 | Young | 106/20 R |
| 2,793,100 | 5/1957 | Weihe | 423/460 |
| 2,833,736 | 5/1958 | Glaser | 83/409 |
| 2,867,540 | 1/1959 | Harris | 106/476 |
| 3,011,902 | 12/1961 | Jordon | 106/30 R |
| 3,024,092 | 3/1962 | Gessler | 23/209.2 |
| 3,025,259 | 3/1962 | Watson et al. | 106/476 |
| 3,043,708 | 7/1962 | Watson et al. | 106/476 |
| 3,335,020 | 8/1967 | Aboytes et al. | 106/476 |
| 3,479,300 | 11/1969 | Rivin et al. | 106/474 |
| 3,528,840 | 9/1970 | Aboytes | 106/473 |
| 3,607,813 | 9/1971 | Purcell et al. | 106/20 R |
| 3,615,578 | 10/1971 | Hectors et al. | 96/91 |
| 3,671,476 | 6/1972 | Terai et al. | 260/23 |
| 3,674,670 | 7/1972 | Erikson et al. | 106/30 R |
| 3,686,111 | 8/1972 | Makhlouf et al. | 524/530 |
| 3,846,141 | 11/1974 | Ostergren et al. | 106/20 R |
| 3,876,603 | 4/1975 | Makhlouf | 106/476 |
| 3,890,683 | 6/1975 | Vodnansky et al. | 29/132 |
| 3,963,510 | 6/1976 | Osswald et al. | 106/289 |
| 3,996,056 | 12/1976 | Muller | 96/75 |
| 4,003,751 | 1/1977 | Carder | 106/20 R |
| 4,006,031 | 2/1977 | Ferch et al. | 106/473 |

(List continued on next page.)

FOREIGN PATENT DOCUMENTS

| | | |
|---|---|---|
| 0 006 190 A1 | 1/1980 | European Pat. Off. . |
| 272127 | 6/1988 | European Pat. Off. . |
| 433229 | 6/1991 | European Pat. Off. . |
| 0 441 987 A2 | 8/1991 | European Pat. Off. . |
| 0 050 354 | 4/1992 | European Pat. Off. . |
| 0 499 857 A1 | 8/1992 | European Pat. Off. . |
| 0 528 644 A1 | 2/1993 | European Pat. Off. . |
| 410152 | 2/1994 | European Pat. Off. . |
| 636591 | 2/1995 | European Pat. Off. . |
| 0 677 556 | 10/1995 | European Pat. Off. . |
| 1164786 | 4/1960 | France . |
| 1215895 | 4/1960 | France . |
| E 72775 | 4/1960 | France . |
| 1224131 | 6/1960 | France . |
| 1230893 | 9/1960 | France . |
| 1331889 | 5/1963 | France . |
| 1480068 | 3/1967 | France . |
| 1559118 | 3/1969 | France . |
| 2477593 | 11/1981 | France . |

(List continued on next page.)

OTHER PUBLICATIONS

BASF Corporation, "For Your Imagination: Polymin (Polyethylenimine)," 1992.

Chemical Abstracts, Abstract No. 118:125805, "Method for Producing Spherical Fine Particles of Colored Resin.".

Chemical Abstracts, Abstract No. 113:193662,"Dispersing Agents for Pigments and Dispersions.".

Chemical Abstracts, Abstract No. 111:99150, "Thermal Transfer Inks Containing Carbon Black for Durable Printing.".

Chemical Abstracts, Abstract No. 109:75440, "Polyester–Polyamines Dispersants for Printing Inks.".

Chemical Abstracts, Abstract No. 108:177334, "Thermal Transfer Recording Ink Sheets With a Polyethylene Imine Derivative Back–Coating.".

Chemical Abstracts, Abstract No. 100:53298, "Rosin Derivatives Used as Dispersants.".

Chemical Abstracts, Abstract No. 111:234461, "Manufacture of Surface–Treated Carbon Black." .

Chemical Abstracts, Abstract No. 111:156103, "Polyamine–Treated Carbon Black Dispersions for Use in Inks and Coatings." .

Derwent Abstract, AN No. 80–03330C, "Sulphonated Carbon Pigment Production by Treating Technical Grade Carbon with Hot Aqueous Acid," SU,A,659, 523, Apr. 1979.

Derwent Abstract, AN No. 82–28019E, "Penetrating Flexographic Print Ink Based Polyacrylic Resin," Oct. 17, 1979, SU,A, 834062.

(List continued on next page.)

*Primary Examiner*—Edward J. Cain

[57] ABSTRACT

An ink composition is disclosed including a colorant and at least one polymer selected from the group consisting of polyvinylimidazole, derivatives of polyvinylimidazole, copolymers of vinylimidazole and copolymers of vinylimidazole derivatives. The present invention also relates to ink compositions including a colorant and at least one polymer selected from polyvinylpyridine, derivatives of polyvinylpyridine, copolymers of vinylpyridine and copolymers of vinylpyridine derivatives. Also disclosed is an ink composition comprising a pigment and at least one polymer selected from the group consisting of polyethyleneimine and derivatives thereof. Further disclosed is a method for generating printed images which include incorporating into a printing apparatus the ink compositions described above and generating an image onto a substrate.

65 Claims, No Drawings

U.S. PATENT DOCUMENTS

| | | | |
|---|---|---|---|
| 4,010,150 | 3/1977 | Tabei et al. | 260/146 |
| 4,014,833 | 3/1977 | Story | 106/472 |
| 4,014,844 | 3/1977 | Vidal et al. | 106/472 |
| 4,061,830 | 12/1977 | Greenberg | 106/287.18 |
| 4,086,054 | 4/1978 | Seibert et al. | 8/89 |
| 4,155,768 | 5/1979 | Adams et al. | 106/23 |
| 4,176,361 | 11/1979 | Kawada et al. | 106/20 R |
| 4,197,135 | 4/1980 | Bailey et al. | 106/23 |
| 4,204,871 | 5/1980 | Johnson et al. | 106/20 R |
| 4,204,876 | 5/1980 | Bowden | 106/474 |
| 4,221,693 | 9/1980 | Getson et al. | 260/37 |
| 4,229,747 | 10/1980 | Hwang | 346/1.1 |
| 4,265,768 | 5/1981 | Beasley et al. | 210/682 |
| 4,290,072 | 9/1981 | Mansukhani | 106/20 R |
| 4,293,394 | 10/1981 | Darlington et al. | 205/524 |
| 4,308,061 | 12/1981 | Iwahashi et al. | 106/20 R |
| 4,320,011 | 3/1982 | Sato et al. | 210/694 |
| 4,328,041 | 5/1982 | Wilson | 106/476 |
| 4,334,878 | 6/1982 | Cutler et al. | 524/88 |
| 4,366,139 | 12/1982 | Kühner et al. | 423/449 |
| 4,415,705 | 11/1983 | Hutter | 525/167.5 |
| 4,442,256 | 4/1984 | Miller | 524/530 |
| 4,451,597 | 5/1984 | Victorius | 524/39 |
| 4,452,638 | 6/1984 | Gallus | 106/97 |
| 4,476,210 | 10/1984 | Croucher et al. | 430/114 |
| 4,476,270 | 10/1984 | Brasen et al. | 524/364 |
| 4,478,905 | 10/1984 | Neely, Jr. | 428/324 |
| 4,503,174 | 3/1985 | Vasta | 523/439 |
| 4,503,175 | 3/1985 | Houze et al. | 524/39 |
| 4,525,521 | 6/1985 | DenHartog et al. | 524/517 |
| 4,525,570 | 6/1985 | Blum et al. | 528/75 |
| 4,530,961 | 7/1985 | Nguyen et al. | 106/20 R |
| 4,537,633 | 8/1985 | Hong | 106/96 |
| 4,544,687 | 10/1985 | Schupp et al. | 523/414 |
| 4,555,535 | 11/1985 | Bednarek et al. | 524/40 |
| 4,556,427 | 12/1985 | Lewis | 106/20 R |
| 4,569,888 | 2/1986 | Muller et al. | 428/481 |
| 4,597,794 | 7/1986 | Ohta et al. | 106/20 C |
| 4,605,596 | 8/1986 | Fry | 428/423.3 |
| 4,620,993 | 11/1986 | Suss et al. | 427/407.1 |
| 4,620,994 | 11/1986 | Suss et al. | 427/407.1 |
| 4,649,064 | 3/1987 | Jones | 427/256 |
| 4,650,718 | 3/1987 | Simpson et al. | 428/413 |
| 4,653,775 | 3/1987 | Raphael et al. | 283/108 |
| 4,657,590 | 4/1987 | Gamblin | 106/22 |
| 4,659,382 | 4/1987 | Kang | 106/22 |
| 4,659,770 | 4/1987 | Vasta | 524/553 |
| 4,664,708 | 5/1987 | Allen | 106/22 |
| 4,665,128 | 5/1987 | Cluff et al. | 525/131 |
| 4,670,059 | 6/1987 | Hackleman et al. | 106/475 |
| 4,680,204 | 7/1987 | Das et al. | 427/407.1 |
| 4,680,332 | 7/1987 | Hair et al. | 524/377 |
| 4,681,811 | 7/1987 | Simpson et al. | 428/413 |
| 4,692,188 | 9/1987 | Ober et al. | 106/23 |
| 4,692,481 | 9/1987 | Kelly | 523/219 |
| 4,694,302 | 9/1987 | Hackleman et al. | 364/1.1 |
| 4,705,567 | 11/1987 | Hair et al. | 106/20 |
| 4,707,548 | 11/1987 | Lotsch et al. | 544/284 |
| 4,710,543 | 12/1987 | Chattha et al. | 525/161 |
| 4,713,427 | 12/1987 | Chattha et al. | 525/510 |
| 4,719,132 | 1/1988 | Porter, Jr. | 427/409 |
| 4,727,100 | 2/1988 | Vasta | 524/40 |
| 4,741,780 | 5/1988 | Atkinson | 106/477 |
| 4,751,204 | 6/1988 | Kyoden et al. | 501/89 |
| 4,752,532 | 6/1988 | Starka | 428/482 |
| 4,764,430 | 8/1988 | Blackburn et al. | 428/413 |
| 4,770,706 | 9/1988 | Pietsch | 106/20 R |
| 4,789,400 | 12/1988 | Solodar et al. | 106/20 R |
| 4,798,745 | 1/1989 | Martz et al. | 427/407.1 |
| 4,798,746 | 1/1989 | Claar et al. | 427/407.1 |
| 4,808,656 | 2/1989 | Kania et al. | 524/512 |
| 4,820,751 | 4/1989 | Takeshita et al. | 523/215 |
| 4,831,011 | 5/1989 | Oikawa et al. | 502/406 |
| 4,840,674 | 6/1989 | Schwarz | 106/20 R |
| 4,853,037 | 8/1989 | Johnson et al. | 106/20 R |
| 4,883,838 | 11/1989 | Jung et al. | 525/119 |
| 4,908,397 | 3/1990 | Barsotti et al. | 523/400 |
| 4,914,148 | 4/1990 | Hille et al. | 524/507 |
| 4,927,868 | 5/1990 | Schimmel et al. | 523/439 |
| 4,959,661 | 9/1990 | Buxton et al. | 346/1.1 |
| 4,961,785 | 10/1990 | Skene et al. | 106/22 |
| 4,963,189 | 10/1990 | Hindagolla | 106/22 |
| 4,975,474 | 12/1990 | Barsotti et al. | 523/400 |
| 4,994,520 | 2/1991 | Mori et al. | 524/547 |
| 5,008,335 | 4/1991 | Pettit, Jr. | 525/111 |
| 5,017,435 | 5/1991 | Barsotti et al. | 428/502 |
| 5,017,644 | 5/1991 | Fuller et al. | 524/612 |
| 5,026,425 | 6/1991 | Hinagolla et al. | 106/22 |
| 5,026,427 | 6/1991 | Mitchell et al. | 106/23 |
| 5,026,755 | 6/1991 | Kveglis et al. | 524/389 |
| 5,051,464 | 9/1991 | Johnson et al. | 524/555 |
| 5,062,893 | 11/1991 | Adamic et al. | 106/22 |
| 5,064,719 | 11/1991 | DenHartog et al. | 428/411.1 |
| 5,066,733 | 11/1991 | Martz et al. | 525/455 |
| 5,076,843 | 12/1991 | Acitelli et al. | 106/22 R |
| 5,091,005 | 2/1992 | Mueller et al. | 106/22 |
| 5,093,391 | 3/1992 | Barsotti et al. | 523/400 |
| 5,093,407 | 3/1992 | Komai et al. | 524/495 |
| 5,098,475 | 3/1992 | Winnik et al. | 106/22 |
| 5,100,470 | 3/1992 | Hindagolla et al. | 106/22 R |
| 5,106,417 | 4/1992 | Hauser et al. | 106/20 R |
| 5,108,502 | 4/1992 | Pawlowski et al. | 106/22 |
| 5,108,503 | 4/1992 | Hindagolla et al. | 106/22 |
| 5,108,505 | 4/1992 | Moffatt | 106/25 |
| 5,109,055 | 4/1992 | Nagasaki et al. | 524/571 |
| 5,114,477 | 5/1992 | Mort et al. | 106/476 |
| 5,120,361 | 6/1992 | Winnik et al. | 106/22 |
| 5,122,552 | 6/1992 | Johnson | 523/454 |
| 5,130,004 | 7/1992 | Johnson et al. | 523/404 |
| 5,130,363 | 7/1992 | Scholl et al. | 524/392 |
| 5,139,574 | 8/1992 | Winnik et al. | 106/22 |
| 5,141,556 | 8/1992 | Matrick | 106/20 R |
| 5,152,801 | 10/1992 | Altermatt et al. | 106/473 |
| 5,159,009 | 10/1992 | Wolff et al. | 106/475 |
| 5,168,106 | 12/1992 | Babcock et al. | 524/495 |
| 5,173,111 | 12/1992 | Krishnan et al. | 106/20 R |
| 5,179,191 | 1/1993 | Jung et al. | 528/272 |
| 5,182,355 | 1/1993 | Martz et al. | 528/75 |
| 5,184,148 | 2/1993 | Suga et al. | 106/20 R |
| 5,190,582 | 3/1993 | Shinozuka et al. | 106/20 D |
| 5,198,022 | 3/1993 | Aulick et al. | 106/22 |
| 5,200,164 | 4/1993 | Medalia et al. | 423/265 |
| 5,204,404 | 4/1993 | Werner, Jr. et al. | 524/501 |
| 5,206,295 | 4/1993 | Harper et al. | 525/207 |
| 5,221,581 | 6/1993 | Palmer et al. | 428/425.8 |
| 5,223,028 | 6/1993 | Aulick et al. | 106/22 |
| 5,226,957 | 7/1993 | Wickramanayake et al. | 106/25 |
| 5,229,452 | 7/1993 | Green et al. | 524/415 |
| 5,230,733 | 7/1993 | Pawlowski | 106/22 |
| 5,232,974 | 8/1993 | Branan, Jr. et al. | 524/495 |
| 5,236,992 | 8/1993 | Bush | 524/495 |
| 5,242,751 | 9/1993 | Hartman | 428/324 |
| 5,254,159 | 10/1993 | Gundlach et al. | 106/22 |
| 5,256,193 | 10/1993 | Winnik et al. | 106/21 |
| 5,266,361 | 11/1993 | Schwarte et al. | 427/407.1 |
| 5,266,406 | 11/1993 | DenHartog et al. | 428/423.1 |
| 5,270,103 | 12/1993 | Oliver et al. | 428/219 |
| 5,276,097 | 1/1994 | Hoffmann et al. | 525/167 |
| 5,277,965 | 1/1994 | Malhortra | 428/216 |
| 5,281,261 | 1/1994 | Lin | 106/20 R |
| 5,282,887 | 2/1994 | Gay et al. | 106/261 |
| 5,286,286 | 2/1994 | Winnik et al. | 106/21 A |

| Patent No. | Date | Inventor | Class |
|---|---|---|---|
| 5,288,788 | 2/1994 | Shieh et al. | 524/495 |
| 5,290,848 | 3/1994 | Palmer et al. | 524/517 |
| 5,300,143 | 4/1994 | Schwarz, Jr. | 106/22 |
| 5,302,197 | 4/1994 | Wickramanayke et al. | 106/20 R |
| 5,304,450 | 4/1994 | Paine | 430/137 |
| 5,310,778 | 5/1994 | Shor et al. | 106/20 D |
| 5,314,945 | 5/1994 | Nickle et al. | 524/507 |
| 5,314,953 | 5/1994 | Corcoran et al. | 525/123 |
| 5,319,044 | 6/1994 | Jung et al. | 526/279 |
| 5,320,738 | 6/1994 | Kaufman | 205/317 |
| 5,324,790 | 6/1994 | Manring | 525/329.9 |
| 5,334,650 | 8/1994 | Serdiuk et al. | 524/591 |
| 5,336,716 | 8/1994 | Kappes et al. | 525/23 |
| 5,336,753 | 8/1994 | Jung et al. | 528/335 |
| 5,342,440 | 8/1994 | Wickramanayke et al. | 106/22 |
| 5,345,254 | 9/1994 | Wong et al. | 347/100 |
| 5,352,289 | 10/1994 | Weaver et al. | 106/476 |
| 5,354,813 | 10/1994 | Farooq et al. | 525/326.7 |
| 5,356,973 | 10/1994 | Taljan et al. | 524/314 |
| 5,360,472 | 11/1994 | Radigan, Jr. et al. | 106/22 |
| 5,364,462 | 11/1994 | Crystal et al. | 106/22 |
| 5,366,828 | 11/1994 | Struthers | 429/101 |
| 5,370,731 | 12/1994 | Yamashita et al. | 106/22 H |
| 5,389,133 | 2/1995 | Gundlach et al. | 106/22 |
| 5,401,313 | 3/1995 | Supplee et al. | 106/475 |
| 5,418,277 | 5/1995 | Ma et al. | 524/520 |
| 5,425,805 | 6/1995 | Botros et al. | 106/22 |
| 5,429,860 | 7/1995 | Held et al. | 428/195 |
| 5,453,121 | 9/1995 | Nicholls et al. | 106/20 |
| 5,484,475 | 1/1996 | Breton et al. | 106/20 |
| 5,554,739 | 9/1996 | Belmont | 534/885 |
| 5,559,169 | 9/1996 | Belmont et al. | 523/215 |
| 5,571,311 | 11/1996 | Belmont et al. | 106/20 R |
| 5,575,845 | 11/1996 | Belmont et al. | 106/712 |
| 5,580,919 | 12/1996 | Agostini et al. | 524/430 |
| 5,622,557 | 4/1997 | Mahmud et al. | 106/712 |
| 5,630,868 | 5/1997 | Belmont et al. | 106/31.75 |
| 5,672,198 | 9/1997 | Belmont | 106/20 |
| 5,698,016 | 12/1997 | Adams et al. | 106/316 |
| 5,713,988 | 2/1998 | Belmont et al. | 106/31.6 |

FOREIGN PATENT DOCUMENTS

| | | |
|---|---|---|
| 2564489 | 11/1985 | France . |
| 2607528 | 6/1988 | France . |
| 1948443 | 4/1971 | Germany . |
| 23 55 758 | 5/1975 | Germany . |
| 24 26 266 A1 | 12/1975 | Germany . |
| 3170748 | 7/1985 | Germany . |
| 3813678 A1 | 11/1988 | Germany . |
| 0 468 140 A2 | 1/1992 | Germany . |
| 56-078629 | 6/1981 | Japan . |
| 59/82467 | 5/1984 | Japan . |
| 01/275666 | 11/1989 | Japan . |
| 5-178604 | 7/1993 | Japan . |
| 05/271365 | 10/1993 | Japan . |
| 5339516 | 12/1993 | Japan . |
| 06/025572 | 2/1994 | Japan . |
| 6025572 | 2/1994 | Japan . |
| 6067421 | 3/1994 | Japan . |
| 6073235 | 3/1994 | Japan . |
| 862018 | 3/1961 | United Kingdom . |
| 1191872 | 5/1970 | United Kingdom . |
| WO 91/02034 | 8/1990 | WIPO . |
| WO 91/15425 | 10/1991 | WIPO . |
| WO 92/13983 | 8/1992 | WIPO . |
| WO94/20551 | 9/1994 | WIPO . |
| WO 95/01838 | 1/1995 | WIPO . |
| WO 96/18688 | 6/1996 | WIPO . |
| WO 96/18694 | 6/1996 | WIPO . |
| WO 96/18695 | 6/1996 | WIPO . |
| WO 96/18696 | 6/1996 | WIPO . |
| WO 96/37547 | 11/1996 | WIPO . |

OTHER PUBLICATIONS

Derwent Abstract, AN No. 86–335147, "Wear Resistant Rubber Composition for Tire Tread Rubber," Apr. 30, 1985, JPA 61–250042, Nov. 198.

Derwent Abstract, AN No. 93–261471, "Carbon Black for Coating Magnetic Recording Media—Having Silicon Dioxide Coating, Giving Good Dispersibility, Lubrication, etc.", Japanese Patent Application No. 5178604, Jul. 20, 1993.

Derwent Abstract, AN No. 95–183086, "Tire Treated Rubber Composition," Oct. 21, 1993, JPA 07102116.

Derwent Abstract, AN No. 94–189154, "Ink for Writing Implements," May 10, 1994, JPA 61–28517A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel*, vol. 43, No. 4, pp. 289–298, 1964, no month.

Roberts et al., *Basic Principles of Organic Chemistry*, Second Edition, W.A. Benjamin, Inc., Pub., p. 1080, no date available.

Allen, "Thermal Ink Jet Printing Trends and Advances," BIS Ink Jet Printing Conference, Oct. 10–12, 1994, Monterey, California.

Schneider, "Continuous Ink Jet," BIS Ink Jet Printing Conference, Oct. 10–12, 1994, Monterey, California.

Major, "Formulating the Future of Automotive Coatings," *Modern Paint and Coatings*, Jul. 1993.

Greenfield, "Fewer Formulation Options Lead to Emphasis on Familiar," *Modern Paint and Coatings*, Jul. 1992.

Schrantz, "Regulations and Competition Push Technological Change," *Modern Paint and Coatings*, Jul. 1994.

"Regulations Focus Formulator Attention on Additives," *Modern Paint and Coatings*, Jul. 1994.

*The Printing Ink Manual*, Fifth Edition, R.H. Leach et al., Blueprint Press, Chapters 8, 9, and 10, no date.

Tsubokawa, "Functionalization of Carbon Black by Surface Grafting of Polymers," *Polym. Sci.*, vol. 17, pp. 417–470, 1992, no month available.

Wolff et al., "The Influence of Modified Carbon Blacks on Viscoelastic Compound Properties," *Kautschuk & Gummi*, Kuststoffe 44, Jahrgang, Nr. Oct. 1991.

Bourdillon et al., "Immobilization of Glucose Oxidase on a Carbon Surface Derivatized by Electrochemical Reduction of Diazonium Salts," *J. Electoanal. Chem.*, vol. 336, pp. 113–123, 1992, no month.

Ohkita et al., "The Reaction of Carbon Black Surface with 2,2–Diphenyl–1–Picrylhydrazyl," *Carbon*, vol. 10, No. 5, pp. 631–636, Mar. 1972.

Watson, "Chemical Aspects of Reinforcement," Compounding Research Department, Dunlop Research Center, Dunlop Rubber Co., pp. 987–999, no date available.

Garten et al., "Nature of Chemisorptive Mechanisms in Rubber Reinforcement," Commonwealth Scientific and Industrial Research Organ., Div. of Industrial Chem., Melbourne, Australia, pp. 596–609, no date available.

Donnet et al., "Chimie Superficielle et Sites Privilegies Des Charges Fines," Extrait de la Revue Generale du Caoutchoic, Jul. 1959.

*Ullmann's Encyclopedia of Industrial Chemistry*, Fifth Edition, vol. A–8, pp. 508–509, 1987, no month.

Donnet et al., "Sur la Structure Aroxylique des Groupements Quinoniques et des Radicaux Libres Presentes en Surface des Noirs de Carbon," *Ref. Gen. Caoutchouc Plastiques*, vol. 42, No. 3, pp. 389–392, 1965 (with English Abstract), no month available.

Yamaguchi et al., "Novel Carbon Black/Rubber Coupling Agent," *Kautschuk & Gummi*, Kuntstoffe 42, Jahrgang, Nr. May 1989.

Studebaker et al., "Oxygen–Containing Groups on the Surface of Carbon Black," *Industrial and Engineering Chemistry*, vol. 48, No. 1, pp. 162–166, Jan. 1956.

Zoheidi et al., "Role of Oxygen Surface Groups in Catalysis of Hydrogasification of Carbon Black by Potassium Carbonate," *Carbon*, vol. 25, No. 6, pp. 809–819, 1987, no month available.

Scherrer, "Coloration of Ink Jet Inks," Presentation at BIS Ink Jet Printing Conference, Oct. 10–12, 1994, Monterey.

*Ink Jet Printing: 1994 Overview and Outlook*, Chapter 7, no month available.

*The Printing Ink Manual*, Fourth Edition, Chapter 2, Leach et al., Eds., 1988, no month available.

Andreottoia, *Ink Jet Ink Technology*, pp. 531–544, no date available.

Gregory, *High–Technology Applications of Organic Colorants*, Chapter 9, "Ink–Jet Printing," 1991, no month.

PCT Search Report, PCT/US95/16452, Apr. 17, 1996.

PCT Search Report, PCT/US95/16195, Apr. 19, 1996.

PCT Search Report, PCT/US95/16281, Apr. 26, 1996.

PCT Search Report, PCT/IB95/01154, Apr. 29, 1996.

PCT International Search Report, PCT/US97/04557, Mar. 6, 1997.

PCT International Search Report, PCT/US97/07349, May 2, 1997.

PCT International Search Report, PCT/US97/09862, May 23, 1997.

PCT International Search Report, PCT/US97/10006, Jun. 9, 1997.

PCT International Search Report, PCT/US97/10027, Jun. 11, 1997.

RAPRA Abstract No. 432845, "Compounding Heat Resistant Non–Black EPDM Rubber Compounding Report," Dec. 1990.

RAPRA Abstract No. 417612, "Review: Polymer–Filler Interactions in Rubber Reinforcement," Oct. 1990.

RAPRA Abstract No. 403202, "Organotitanate, Zirconate Effect on Elastomers," Jun. 1990.

RAPRA Abstract No. 394030, "Mechanical Properties of Natural Rubber/Grafted Cellulose Fibre Composites," 1990.

RAPRA Abstract No. 390600, "Application of Coupling Agents to Elastomers," 1989, no month.

RAPRA Abstract No. 00388935, "Light Coulored Fillers in Polymers," Nov. 1989.

Dialog Abstract EMA No. 8602–C1–D–0297, "Carbon Black is Better With Silica," Oct. 1985.

RAPRA Abstract No. 00343229, "White and Black Fillers for Rubber Compounds," Dec. 1986.

RAPRA Abstract No. 00177481, "Ethylene–Propylene Rubbers," 1981, no month available.

RAPRA Abstract No. 00105623, "Putting Performance Into Thermosets with Titanium Coupling Agents," Oct. 1976.

RAPRA Abstract No. 00056893, "Applications for Silane Coupling Agents in the Automotive Industry," Oct. 1975.

RAPRA Abstract No. 00002608, "Ground Rice Hull Ash as a Filler for Rubber," Oct. 1974.

RAPRA Abstract No. 00000937, "Reduction of Heat Build–up in Mineral–Filled Elastomers Through the Use of Silane Coupling Agents," May 1973.

RAPRA Abstract No. 00105623, "Putting Performance into Thermosets With Titanium Coupling Agents," Oct. 1976.

Tsubokawa et al., "Grafting Onto Carbon Black Having Few Functional Groups," Shikazai Kyokaisha, vol. 66, No. 5 (1993), Abstract Only, no month available.

J.B. Donnet et al., "Radical Reactions and Surface Chemistry of Carbon Black," Bull. Soc. Chim. 1960 (Abstract Only), no month available.

Chemical Abstracts, Abstract No. 121:241879 CA, "Lithographic Plates Utilizing Silver Complex Diffusion Transfer Process", JP 06161113, Jun. 7, 1994.

Chemical Abstracts, Abstract No. 105:200558 CA, "Dye Transfer Method", DE 3542344, Jun. 5, 1986.

Chemical Abstracts, Abstract No. 105:70102 CA, "Dye Transfer Method", EP 180224, May 7, 1986.

Chemical Abstracts, Abstract No. 103:132306 CA, "Image Receptor Element for the Color Diffusion Tranfer Process", DE 3345070 A1, Jun. 20, 1986.

Chemical Abstracts, Abstract No. 103:72833 CA, "*Paper*, Cardboard, and Paperboard with High Dry and Wet Strength and Alkali Resistance", DE 3343105 A1, Jun. 5, 1985.

Chemical Abstracts, Abstract No. 103:14527 CA, "Photoimaging Units Containing Polymer Blend Type Dye–Mordanting Layers", JP 60057836, Apr. 3, 1985.

Chemical Abstracts, Abstract No. 100:148446 CA, "Photographic Material with Image–Receiving Layer Containing Copper or Nickel Aluminosilicates", DE 3217386, Nov. 10, 1983.

Chemical Abstracts, Abstract No. 96:94932 CA, "Method of Making Dye Mordant Layers for Photographic Dye Diffusion Transfer Systems", GB 1594961A, Aug. 5, 1981.

Chemical Abstracts, Abstract No. 96:13610 CA, "Photographic Colour Diffusion Transfer Materials Containing Timing Layers", EP 37724, Oct. 14, 1981.

Chemical Abstracts, Abstract No. 123:317086 CA, "*Ink* Acceptor Material", WO 9516561, Jun. 22, 1995.

Chemical Abstracts, Abstract No. 123:114539 CA, "Polymeric Mordants", WO 9420551, Sep. 15, 1994.

Chemical Abstracts, Abstract No. 109:160686 CA, "*Ink* Jet Recording Method", JP 63060783, Mar. 16, 1988.

Chemical Abstracts, Abstract No. 107:106211 CA, "Preprinted Image–Receiving Elements for Laminated Documents", US 4,653,775, Mar. 31, 1987.

Chemical Abstracts, Abstract No. 103:122026 CA, "Oxygen Indicators for Food Packaging", JP 60063464, Apr. 11, 1985.

Chemical Abstracts, Abstract No. 102:195234 CA, "Screen Printing Plates, Their Preparation and Printing Process", JP 60034899, Feb. 22, 1985.

Chemical Abstracts, Abstract No. 101:173134 CA, "Screen Printing Plates, Their Preparation and Printing Process", JP 60034899, Feb. 22, 1985.

Chemical Abstracts, Abstract No. 94:183456 CA, "Photopolymerizable Compositions Based on Salt–Forming Polymers and Polyhydroxy Polyethers", U.S. 4245031, Jan. 31, 1981.

Chemical Abstracts, Abstract No. 123:106495 CA, "Monomolecular Enzyme Films Stabilized by Amphiphilic Polyelectrolytes for Biosensor Devices", *Thin Solid Films*, (1995), 260(2), 212–16.

Chemical Abstracts, Abstract No. 123:84633 CA, "Highly Interacting Polymer Blends. Poly(monoethyl itaconate)/poly(vinylpyridine)", *Polymer*, (1995), 36(14), 2765–72.

Chemical Abstracts, Abstract No. 122:316318 CA, "Enhancement of the Monovalent Cation Permselectively of Nafion by Plasma–induced Surface Modification", *J. Adhes. Sci. Technol.*, (1995), 9(5), 615–625.

Chemical Abstracts, Abstract No. 122:162314 CA, "Miscibility and Phase Behavior in Poly(4–Vinylpyridine)/poly-(ethylene–co–vinyl Alcohol) Blends", *Macromol. Rapid Comm.*, (1994), 15(11), 903–908.

Chemical Abstracts, Abstract No. 121:256977 CA, "Electronic–ionic Conducting Interpenetrating Polymer Networks Based on (Castor Oil–Polyethylene Glycol) Polyurethane", *Polymer Prepr. (American Chemical Society Div. Polym. Chem.*, (1994), 35(1), 325–326.

Chemical Abstracts, Abstract No. 121:122832 CA, "Photocurrent Characteristics of Two–Layered Organic Thin Films Prepared by Plasma Polymerization", *Polym. J. (Tokyo)*, (1994), 26(6), 754–757.

Chemical Abstracts, Abstract No. 116:161030 CA, "An Alternating Current Impedance Model Including Migration and Redox–Site Interactions at Polymer–Modified Electrodes", *J. Phys. Chem.*, (1992), 96(7), 3174–82.

Chemical Abstracts, Abstract No. 115:67979 CA, "Dual Oxidant System for Reducing Ascorbic Acid Interference in Liquid or Dry–Phase Assay Systems and Method Relating Thereto", EP 392305, Oct. 17, 1990.

Chemical Abstracts, Abstract No. 112:167571 CA, "Treatment and Disposal System for a Heavy Metals Waste Containing Soluble Technetium -99", Report (1989) K/Qt–230–R, Order No. DE89016576, 24 pp.

Chemical Abstracts, Abstract No. 106:76223 CA, "Thermal Transfer Recording Materials", JP 61143184, Jun. 30, 1986.

Chemical Abstracts, Abstract No. 103:132521 CA, "Photolytic Development of a Colored Image on a Cellulosic Material with Monosulfonyl Azides", DE 3440508 A1, Jun. 5, 1985.

Chemical Abstracts, Abstract No. 102:70293 CA, "Diffusion–Transfer Type Color Polythermographic Photosensitive Materials", JP 59159158 A2, Sep. 8, 1984.

Chemical Abstracts, Abstract No. 99:222384 CA, "Photosensitive Resin Compositions for Imaging Processes", JP 58015531 A2, Jan. 28, 1983.

Chemical Abstracts, Abstract No. 97:191279 CA, "Heat–Sensitive Color–Forming Recording Material", EP 58083 A2, Aug. 18, 1982.

Chemical Abstracts, Abstract No. 96:152779 CA, "Irradiation Treatment of Polymeric Photographic Film Supports", US 4,311,774, Jan. 19, 1982.

Chemical Abstracts, Abstract No. 96:152779 CA, "Irradiation Treatment of Polymeric Photographic Film Supports", US 4,311,774, Jan. 19, 1982.

Chemical Abstracts, Abstract No. 95:117329 CA, "Chemistry of *Paper* Wet Strength. II Design and Synthesis", *Cellul. Chem. Technol.* (1981), 15(2), 247–63.

Chemical Abstracts, Abstract No. 94:93651 CA, "Photosensitive Resin Compositions", JP 55098744, Jul. 28, 1980.

Chemical Abstracts, Abstract No. 93:213306 CA, "Diffusion–transfer Color Photographic Materials", JP 55012585, Apr. 2, 1980.

Chemical Abstracts, Abstract No. 93:200576 CA, "Apparatus and Method for Determining Ionic Strength and Density of a Liquid Sample", BE 879888, Mar. 3, 1980.

Chemical Abstracts, Abstract No. 92:148611 CA, "Intrachromospheruloid–Intraleuco–Spheruloid Pigment Compositions", U.S. 4,169,737, Oct. 2, 1979.

Chemical Abstracts, Abstract No. 87:14210 CA, "Diffusion–transfer image–receiving element having poly(vinylpyridine) layer treated with hydrophilic colloid/ammonia solution", U.S. 4,009,031, Feb. 22, 1977.

Chemical Abstracts, Abstract No. 84:158024 CA, "Positive Toner for Electrophotography", JP 50124648, Sep. 30, 1975.

Chemical Abstracts, Abstract No. 84:76070 CA, "Substrate Coated with a Layer of Polyquatemary Polyelectrolytes", US 3,927,242, Dec. 16, 1975.

Chemical Abstracts, Abstract No. 83:19039 CA, "Dry Transfer Sheets and Photosensitive Materials for Their Manufacture", FR 2214593, Aug. 19, 1974.

Chemical Abstracts, Abstract No. 74:142415 CA, "Image Receiver in Diffusion Transfer Photography", FR 2132054, Dec. 22, 1972.

Chemical Abstracts, Abstract No. 78:65186 CA, "Diffusion–Transfer Photographic Film", DE 2215392, Oct. 5, 1972.

Chemical Abstracts, Abstract No. 75:146232 CA, "Mordanting Process for Color Print Material", DE 2111506, Sep. 23, 1971.

Chemical Abstracts, Abstract No. 69:48253 CA, "Photographic Image–Receiving Elements Having Been Treated with Ammonia After Drying", US 3,388,994, Jun. 18, 1968.

Chemical Abstracts, Abstract No. 68:64604 CA, "Color Diffusion Transfer Photographic Products Utilizing an Image Receiving Element Containing a Polymeric Acid Layer", US 3,362,819, Jan. 9, 1968.

Chemical Abstracts, Abstract No. 68:80808 CA, "Photographic Color Diffusion Transfer Process Materials", US 3,295,970, Jan. 3, 1967.

Chemical Abstracts, Abstract No. 66:11796 CA, "Improving the Surface Properties of Receptive Substrates", NL 6601681, Aug. 11, 1966.

Chemical Abstracts, Abstract No. 122:242504 CA, "**Waterfast* Jet Printing Inks", US 5,364,462, Nov. 15, 1994.

Chemical Abstracts, Abstract No. 110:116899 CA, "**Waterfast* Ink Jet Compositions and Process", US 4,789,400, Dec. 6, 1988.

Chemical Abstracts, Abstract No. 107:98387 CA, "**Waterfast* Ink Jet Compositions", US 4,664,708, May 12, 1987.

Chemical Abstracts, Abstract No. 107:41895 CA, "**Waterfast* Ink Jet Composions and their Preparation", US 4,659,382, Apr. 21, 1987.

Chemical Abstracts, Abstract No. 93:48750 CA, "**Waterfast* Ink for Use in Ink Jet Printing", US 4,197,135, Apr. 8, 1980.

Chemical Abstracts, Abstract No. 118:12805 CA, "Method for Producing Spherical Fine Particles of Colored Resins", EP 501063, Sep. 2, 1992.

Chemical Abstracts, Abstract No. 113:193662 CA, "Dispersing Agents for Pigments and Dispersions", JP 02048029 A2, Feb. 16, 1990.

Chemical Abstracts, Abstract No. 113:134220 CA: "Alkoxylated Polyamine Dispersant for Nonaqueous Systems in Paints and Inks", EP 359034, Mar. 21, 1990.

Chemical Abstracts, Abstract No. 111:136271 CA, "Bleachability of Deinked Stock and Mechanical Pulps. Part II. Effect of Disturbing Substances", *Wochenbl. Papierfabr.*, (1989), 117(11–12), 511–518 and 520.

Chemical Abstracts, Abstract No. 111:99150 CA, "Thermal Transfer Inks Containing *Carbon* *Black* for Durable Printing", JP 01081874, Mar. 28, 1989.

Chemical Abstracts, Abstract No. 109:75440 CA, "Polyester–Polyamine Dispersants for Printing Inks", JP 63012335, Jan. 19, 1988.

Chemical Abstracts, Abstract No. 108:177334 CA, "Thermal Transfer Recording *Ink* Sheets with a Polyethyleneimine Derivative Back–Coating", JP 62271791, Nov. 26, 1987.

Chemical Abstracts, Abstract No. 100:53298 CA, "Rosin Derivatives Used as Dispersants", US 4,415,705, Nov. 15, 1983.

Chemical Abstracts, Abstract No. 120:302620 CA, "Hydrophilic Dispersant Containing *Carbon* *Black*–containing *paper*", JP 05262508, Oct. 12, 1993.

Chemical Abstracts, Abstract No. 113:79291 CA, "Methods for Prevention of Polymer Deposition on Reactors during Polymerization", JP 02047106, Feb. 16, 1990.

Chemical Abstracts, Abstract No. 79:141503 CA, "Advantages of Using Polymeric Bases as Fixatives in Hydrotype", *Usp. Nauch. Fotogr.* (1972), 16, 51–8.

Chemical Abstracts, Abstract No. 79:34920 CA, "Treatment of Waste Dyeing Solutions", JP 48020981, Mar. 15, 1973.

Chemical Abstracts, Abstract No. 68:79735 CA, "Poly(alkylenimines) as papermaking additives", *Papier (Darmstadl)*, 1968, 22(3), 124–30.

Chemical Abstracts, Abstract No. 111:234461 CA, "Manufacture of Surface–Treated *Carbon* *Black*", JP 01152165, Jun. 14, 1989.

Chemical Abstracts, Abstract No. 111:156103 CA, "Polyamine–treated *Carbon* *Black* Dispersions for Uses in *Inks* and Coatings", JP 01079279, Mar. 24, 1989.

Advanced Topic Tutorial Notes—A Two Hour Tutorial—Wednesday Afternoon Nov. 1, 1995, 1:30 p.m.–3:30 p.m., IS&T's Eleventh International Congress on Advances in Non–Impact Printing Technologies (A–4 Ink/Media Interactions), Hewlett Packard, Hilton Head, South Carolina.

Delamar et al., J. Am. Chem. Soc. 1992, 114, 5883–5884, no month available.

Derwent Abstract, AN No. 85–162215, "Aq. Pigment Dispersion for Paints, Inks, etc. Contains Novel Polymeric Dispersing Agent" JP 830201188, Oct. 27, 1983.

Patent Abstracts of Japan Publication No. JP6220395, "Composition for Aqueous Coating" Aug. 9, 1994.

INK COMPOSITIONS AND METHOD FOR GENERATING IMAGES PRODUCED THEREFROM

BACKGROUND OF THE INVENTION

1. Field of the Invention

This invention relates to ink compositions useful for ink jet printing. Preferably, these compositions, when printed, promote improved waterfastness.

2. Discussion of the Related Art

Ink jet printing is a non-impact process wherein droplets of ink are produced and deposited on a substrate such as paper, transparent film, or textile material in response to an electronic signal. Typical ink jet printing systems are continuous stream or drop-on-demand type.

In continuous ink jet systems, ink is emitted in a continuous stream under pressure through at least one orifice or nozzle. The stream is perturbed, causing it to break up into droplets at a fixed distance from the orifice. At the breakup point, the droplets are charged in accordance with digital data signals and passed through an electrostatic field. The field adjusts the trajectory of each droplet to direct it to a gutter for recirculation or to a specific location on a recording medium to create images. In drop-on-demand systems, a droplet is expelled from an orifice directly to a position on a recording medium by pressure generated in accordance with digital data signals.

There are three basic types of drop-on-demand ink jet systems. One type has an ink filled channel with a nozzle on one end and a piezoelectric transducer which produces pressure pulses.

A second type of drop-on-demand system is known as a thermal ink jet or bubble jet printer. The major components are an ink-filled channel with a nozzle at one end and a heat generating resistor. A pressure difference between the inside and outside of the channel is generated by heating the resistor, causing the ink in the immediate vicinity to vaporize, creating a bubble.

The third type of drop-on-demand ink jet system is known as an acoustic ink printer. This printer utilizes a piezoelectric transducer to form acoustic energy which exerts pressure on the liquid in the channel, resulting in the ejection of small droplets of ink onto an imaging substrate.

Conventional inks for ink jet printers generally comprise a dye which is soluble in a vehicle of water or a mixture of water and a water-soluble or water-miscible organic solvent. However, dyes have several disadvantages when used in ink jet inks. Dyes, being water-soluble or soluble in a water and organic mixture, may redissolve and run when exposed to moisture or water, i.e., they have poor waterfastness. Dyes may also be sensitive to changes in color or pH. Dye images may further smear and rub off on contact with felt pen markers or upon being rubbed with a finger. Dyes also exhibit poor light stability when exposed to visible or ultraviolet light, for example, sun or fluorescent light. Inks comprising soluble dyes may also experience clogging of the jetting channels due to solvent evaporation, thereby resulting in changes in the dye's solubility, dye crystallization, and the concentration of impurities. Dye-based ink may also exhibit poor thermal and chemical stability which can result in poor print quality. The dye may also bleed or diffuse into pores of the paper, thus causing poor print quality and low optical density of the image. Because of these problems, specialty paper is often necessary for ink jet inks containing a dye. Similarly, the addition of polyethyleneimine ("PEI") to certain water-soluble dyes in inkjet inks is known to improve the waterfastness of the dyes on the receiving paper. Furthermore, undesirable heavy metals or other additives may be necessary in dye-based inks to obtain an infrared or readable image. For a general discussion on the properties, preparation, and uses of aqueous inks, see *The Printing Manual,* 5th Ed., Leach et al., Eds. (Chapman & Hall, 1993), incorporated in its entirety by reference.

While these dye-based inks containing PEI constitute an improvement, they still have disadvantages. The dyes of the inks still tend to exhibit several undesirable properties, as discussed above. In addition, the desired waterfastness is not always achieved.

Although not as common, pigments have also been used as colorants in inkjet inks, either as alternatives for, or in combination with, dyes. Pigments tend to offer improved properties to dyes in areas such as lightfastness, image density, thermal stability, pH insensitivity, oxidative and chemical stability, non-bleeding, compatibility with other colorants, and compatibility with both coated/treated and plain papers. Pigments used in ink jet inks include carbon black, titanium dioxide white, cobalt blue ($CoO\text{-}Al_2O_3$), phthalocyanine blue, phthalocyanine green, and chrome yellow ($PbCrO_4$).

Regardless of their desirable properties, pigments have not replaced dyes as the prevalent colorant in ink jet inks because of the difficulty often associated with obtaining an adequate dispersion of pigment in an ink. Pigment particles such as carbon black generally exist in a clumped or agglomerated state. To prepare ink jet inks, however, the carbon black should be dispersed and then stabilized in that dispersed form. Such dispersion and stabilization are difficult to attain. Unstable or inadequate dispersion may result in scaling or clogging of the opening, thereby interrupting nozzle flow. As such, the extent of dispersion directly affects ink jet printing characteristics such as ejectability, print quality, optical density, and the like.

Thus, there remains a need for improved ink compositions possessing the required stability, especially for use in ink jet printers, which overcome the problems typically associated with current pigment and dye-based systems. In addition, a need remains for ink composition generating print images having improved waterfastness.

SUMMARY OF THE INVENTION

The present invention relates to ink compositions comprising a colorant and at least one polymer selected from polyvinylimidazole, derivatives of polyvinylimidazole, copolymers of vinylimidazole and copolymers of vinylimidazole derivatives. The present invention also relates to ink compositions comprising a colorant and at least one polymer selected from polyvinylpyridine, derivatives of polyvinylpyridine, copolymers of vinylpyridine and copolymers of vinylpyridine derivatives. The present invention further relates to an ink composition comprising a pigment and at least one polymer selected from the group consisting of polyethyleneimine and derivatives thereof. Optionally, the ink compositions of the present invention further comprise an ammonium salt. The ink compositions may be used in ink jet inks and other suitable applications.

Also disclosed is a method for generating printed images which include incorporating into a printing apparatus the ink compositions described above and generating an image onto a substrate. Preferably, the images generated from the ink compositions of the present invention exhibit improved waterfastness.

Both the foregoing general description and the following detailed description are exemplary, and are intended to provide further explanation of the invention as claimed.

DETAILED DESCRIPTION OF THE INVENTION

The present invention relates to ink compositions suitable for use in ink jet printers. Preferably, the images generated from the ink compositions have improved waterfastness.

According to one embodiment of the present invention, the ink compositions include a colorant and at least one polymer selected from polyvinylimidazole, derivatives of polyvinylimidazole, copolymers of vinylimidazole and copolymers of vinylimidazole derivatives (collectively referred to as "PVI"). The polymer should be soluble in the ink composition. By "soluble" it is meant that the polymer will dissolve in the ink vehicle to form a one phase system. A preferred polyvinylimidazole is poly-N-vinylimidazole. Preferred copolymers of polyvinylimidazole contain a monomer selected from acrylate esters, acrylate amides, methacrylate esters, methacrylate amides, acrylonitrile, vinyl pyrrolidone, and vinyl chloride. The polymer may alternatively be at least one polymer selected from polyvinylpyridine, derivatives of polyvinylpyridine, copolymers of vinylpyridine and copolymers of vinylpyridine derivatives. The discussion herein relating to PVI is similarly applicable to these polymers. The polymer is preferably present in an amount sufficient to promote the waterfastness of images generated from the ink composition without detrimentally affecting the properties of ink composition itself, e.g., stability, typically between about 0.1% and 10%, preferably between 0.5% and 5%, based on the weight of the ink composition.

The colorant in the ink formulation may be a pigment, a dye, or a combination thereof, and has a negative charge, a positive charge, or is uncharged. In the case of a negatively charged colorant, the ink is typically formulated to be basic, i.e., pH above 7, in order to maintain a stable solution while the ink is stored in the ink jet printer. However, the receiving media, e.g. paper, typically has a lower pH relative to the pH of the ink. Upon application of the ink to the paper surface, it is believed that the nitrogen atoms of the PVI become protonated, thus attracting the negatively charged colorant. The protonated PVI and negatively charged colorant form an insoluble complex that precipitates or flocculates out of the ink solution and adheres to the paper surface, thereby preferably improving the degree of waterfastness of the print.

When the colorant is positively charged, it is furthered believed that there is no charge attraction between the protonated nitrogen atoms of the PVI and the cationic colorant when the ink is applied to the paper. Because it is thought that the paper fibers carry some negative charge, it is theorized that the cationic colorant is attracted to the paper surface and would, on its own, form a print preferably having a relatively good waterfastness. It has been found, however, that the addition of PVI contributes to an improved waterfastness of the generated image. The inventors, while not limiting the present invention to any particular theory, believe that when the PVI is adhering to the paper surface, the polymer may trap or bind some of the cationic colorant, thereby preferably improving the waterfastness of the print.

It is expected that an uncharged colorant would also be useful in the aqueous ink compositions of the present invention, provided that the colorant can be formulated into an ink jet ink composition possessing the required stability. To this end, the use of surfactants, e.g. non-ionic surfactants, may be necessary to help stabilize the system, thereby preventing precipitation or flocculation of the colorant.

It should be recognized that the protonization of the nitrogen to form the insoluble complex will occur over a wide range of pH and may depend on the molecular weight and type of polymer. As a result, it is desirable to keep the pH of the ink sufficiently high, especially when using a negatively charged colorant, to prevent the precipitation or flocculation of the insoluble complex in the printing device. This protonization mechanism only becomes desirable once the ink makes contact with the print media. It has been found that a weight average molecular weight of the polymer less than 50,000, more preferably less than 30,000, is effective in the ink composition of the present invention.

It is expected that any colorant capable of interacting with PVI in one of the manners described above will be suitable for use in the ink compositions of the present invention to preferably enhance the degree of waterfastness of the print. In one embodiment, the colorant is a charged, carbon product as described in U.S. patent application Ser. No. 08/356,653 entitled "Reaction of Carbon Materials with Diazonium Salts and Resultant Carbon Products," filed Dec. 15, 1994, the disclosure of which is fully incorporated by reference herein. In another embodiment, the colorant is a charged, modified carbon black having at least one attached organic group. A complete discussion of these modified carbon black products can be found in U.S. patent application Ser. No. 08/356,660 entitled "Reaction of Carbon Black With Diazonium Salts, Resultant Carbon Black Products and Their Uses," filed Dec. 15, 1994, and its continuation-in-part application, Ser. No. 08/572,525, filed Dec. 14, 1995 the disclosures of which are fully incorporated by reference herein.

A preferred set of organic groups which may be attached to the carbon black are organic groups substituted with an ionic or an ionizable group as a functional group. An ionizable group is one capable of forming an ionic group in the medium of use. The ionic group may be an anionic group or a cationic group and the ionizable group may form an anion or a cation. If an ionizable group is attached to the colorant, it will be recognized by those skilled in the art that a stabilizing agent, such as sodium hydroxide, may be necessary to prevent the premature precipatation or flocculation of the colorant in the ink composition Furthermore, when the pigment contains negatively charged groups, it is preferred that the polymer is non-quarternized in order to maintain the stability of the ink composition.

Ionizable functional groups forming anions include, for example, acidic groups or salts of acidic groups. The organic groups, therefore, include groups derived from organic acids. Preferably, when an organic group contains an ionizable group forming an anion, such an organic group has a) an aromatic group and b) at least one acidic group having a $pK_a$ of less than 11, or at least one salt of an acidic group having a $pK_a$ of less than 11, or a mixture of at least one acidic group having a $pK_a$ of less than 11 and at least one salt of an acidic group having a $pK_a$ of less than 11. The $pK_a$ of the acidic group refers to the $pK_a$ of the organic group as a whole, not just the acidic substituent. More preferably, the $pK_a$ is less than 10 and most preferably less than 9. Preferably, the aromatic group of the organic group is directly attached to the carbon black. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. Most preferably, the organic group is a substituted or unsubstituted sulfophenyl group or a salt thereof; a substituted or unsubstituted carboxyphenyl; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof. Such groups include, for example, $C_6H_4SO_3^-M^+$, $C_6H_4CO_2^-M^+$, wherein $M^+$ is $Na^+$, $K^+$, or $Li^+$. A preferred substituted sulfophenyl group is hydroxysulfophenyl group or a salt thereof.

Amines represent examples of ionizable functional groups that form cationic groups. For example, amines may be protonated to form ammonium groups in acidic media. Preferably, an organic group having an amine substituent has a $pK_b$ of less than 5. Quaternary ammonium groups and quaternary phosphonium groups also represent examples of cationic groups. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and even quaternized aromatic amines, can also be used as the organic group. Thus, N-substituted pyridinium compounds, such as N-methyl-pyridyl, can be used in this regard.

Examples of organic groups include, but are not limited to, $C_6H_4N(CH_3)_3^+X^-$, $C_6H_4COCH_2N(CH_3)_3^+X^-$, $C_6H_4(NC_5H_5)^+X^-$, $(C_5H_4N)C_2H_5^+X^-$, $C_6H_4COCH_2(NC_5H_5)^+X^-$, $(C_5H_4N)CH_3^+X^-$, and $C_6H_4CH_2N(CH_3)_3^+X^-$, wherein $X^-$ is a monovalent ion. Preferred attached organic groups for the present invention include $C_6H_4N(C_3H_3)_3^+X^-$ and $C_6H_4(NC_5H_5)^+X^-$ because such groups have been found to particularly improve the degree of waterfastness in images or prints generated from the ink compositions.

Preferably, the modified carbon black products or other pigments are present in the ink in amounts sufficient to provide the desired image quality, e.g., optical density, without detrimentally affecting the performance of the ink. Typically, the modified carbon black products or other pigments will be present in an amount ranging from about 1% to about 20%, preferably from about 2% to about 10%, based on the weight of the ink composition. Similarly, to the extent that modified carbon blacks or other carbon products are used, scuh carbon blacks or carbon products should be treated with the desired agent in an amount sufficient to provide the desired utility in the print while maintaining the stability of the pigment in the ink composition.

In addition to pigments, dyes may also be used, alone, or in combination with pigments, in the ink compositions of this invention. Any dyes which interact with PVI in the manners discussed above and are soluble in the ink composition are suitable and include Direct Dyes, Acid Dyes and Food Dyes. Preferably, the dyes have at least one anionic group in order to form an insoluble complex. In general, the concentration of the dye is between about 1% and about 10% by weight, preferably between about 2% and about 7% by weight, based on the weight of the ink composition.

It has further been found that the addition of ammonium salts may further enhance the waterfastness of the prints or images generated from the ink compositions of this invention. The ammonium salt is added to the ink compositions in amounts effective to improve the waterfastness in prints or images generated therefrom, as compared to the same ink compositions without the ammonium salt, but which do not act to destabilize the ink composition. Depending on the ionic strength of the salt, the concentration of the ammonium salt is typically found to be between about 0.02 molar and about 0.06 molar. Although not completely understood, it is believed that the amine of the ammonium salt will evaporate as the print dries, thereby enhancing the cationic nature of the polymer and ultimately accelerating the precipitation or flocculation of the insoluble complex, as described above.

The ammonium salt has a positive ion selected from the group consisting of ammonium, alkyl ammonium, dialkyl ammonium, trialkyl ammonium, arylalkyl ammonium, cyclic ammonium, and cyclic alkyl ammonium, and a negative ion selected from the group consisting of alkanoate, cycloalkyl carboxylate, aromatic carboxylate, arylalkyl carboxylate, alkylaryl carboxylate, sulfonate, and anions derived from a mineral acid. Preferably, the ammonium ion is selected from the group consisting of ammonium, methylammonium, diethylammonium, trimethylammonium, triethylammonium, benzylammonium, piperidinium, and pyrrolidinium, and said anion is selected from the group consisting of acetate, propionate, butyrate, cyclohexanecarboxylate, benzoate, phenyl acetate, methane sulfonate, benzene sulfonate, and toluene sulfonate. Preferably, the amine is volatile and the acid is non-volatile. Ammonium benzoate is a particularly preferred salt. In addition, it has further been found that an additional amount of an amine incorporated into the ink composition is useful in improving the ageing stability of the composition.

In another embodiment of the invention, the ink composition comprises a pigment and at least one polymer selected from polyethyleneimine, and derivatives thereof, such as hydroxyethylated PEI, ethoxylated PEI, hydroxypropylated PEI, epichlorohydrin-modified PEI, and the like (collectively referred to as "PEI"). The PEI is preferably present in an amount sufficient to promote the waterfastness of images generated from the ink composition without detrimentally affecting the properties of ink composition itself, e.g., stability, typically between about 0.01% and 10%, preferably between 0.02% and 5%, based on the weight of the ink composition. In addition, it has been found that a weight average molecular weight of the PEI ranging between about 300 to about 70,000, more preferably between about 600 to about 50,000, is effective in the ink composition of the present invention.

Any pigment that interacts with PEI in the manner discussed above with respect to PVI are also applicable and may similarly be utilized in this embodiment of the present invention. For example, the pigment may be positively charged, negatively charged, or uncharged. The pigment is preferably a carbon black, and more preferably a charged carbon black having attached organic groups, as discussed earlier with respect to PVI. Finely divided carbon products and other pigments may also be useful in the ink compositions containing PEI if they are similarly capable of interacting with the polymer and the paper surface and provide the required stability. The modified carbon black products or other pigments are present in the ink in amounts sufficient to provide the desired image quality, e.g., optical density, without detrimentally affecting the performance of the ink. Typically, the modified carbon black products or other pigments will be present in an amount ranging from about 1% to about 20%, preferably from about 2% to about 10%, based on the weight of the ink composition. Similarly, to the extent that modified carbon blacks or other carbon products are used, the blacks or products should be treated with the desired agent in an amount sufficient to provide the desired utility in the end product application while maintaining the stability of the pigment in the ink composition. Likewise, the earlier discussion on the interrelationship between the colorant and PVI is also applicable to the ink compositions including a pigment and PEI. Finally, the same ammonium salts useful in the compositions containing PVI may also be used in the ink compositions containing PEI. The ammonium salt is added to the ink compositions in amounts effective to improve the waterfastness in prints or images generated therefrom, as compared to the same ink compositions without the ammonium salt, but which do not act to destabilize the ink composition. Depending on the ionic strength of the salt, the concentration of the ammonium salt is typically found to be between about 0.02 molar and about 0.06 molar.

The ink compositions of the present invention may be prepared utilizing conventional techniques known to those skilled in the art, such as combining or mixing the desired components in suitable medium. Typically, the ink compositions are aqueous sytems and include therein a significant amount of water, preferably deionized or distilled water. For example, the amount of water or similar medium is generally present in an amount ranging from about 60% to about 95%, preferably from about 75% to about 90%, based on the weight of the ink composition.

Suitable additives are generally incorporated into the ink compositions to impart a number of desired properties while maintaining the stability of the compositions. Such additives are well known in the art and include humectants, biocides, binders, drying accelerators, penetrants, surfactants, and the like. For example, a humectant may be added to reduce the rate of evaporation of water in the ink to minimize printhead nozzle clogging. If the ink begins to dry out, the humectant concentration increases and evaporation decreases further. Humectants may also affect other properties of the ink and prints made therefrom, such as viscosity, pH, surface tension, optical density, and print quality. Such humectants typically includes ethylene glycol, propylene glycol, diethylene glycols, glycerine, dipropylene glycols, polyethylene glycols, polypropylene glycols, alkane diols, amides, ethers, carboxylic acids, esters, alcohols, organosulfides, organosulfoxides, sulfones, alcohol derivatives, 2-pyrrolidone, ether derivatives, amino alcohols, and ketones. The amount of a particular additive will vary depending on a variety of factors including the molecular weight of the polymers, the viscosity, the amount of any ammonium salt added, as well as the nature of the polymers, the nature of any organic groups attached to the pigment, e.g., modified carbon black products.

Printed images may be generated from the ink compositions of the present invention by incorporating such compositions into a suitable printing apparatus, and generating an image onto a substrate. Suitable ink jet printers include, for example, thermal printers, piezoelectric printers, continuous printers, valve printers and the like. Similarly, any suitable substrate can be employed including plain papers, bonded papers, coated papers, transparency materials, textile materials, plastics, polymeric films, inorganic substrates and the like.

The invention will be further clarified by the following examples, which are intended to be purely exemplary of the invention.

Procedures

The following procedures were used to determine relevant properties throughout the examples.

Carbon Black Characterization: BET nitrogen surface areas were obtained according to ASTM D-4820. CTAB surface area was determined according to ASTM D-3765. DBPA structure data was obtained according to ASTM D-2414.

Surface Tension: The surface tensions of the inks were measured using a CSC-DU NOUY Tensiometer, No. 70535 from CSC Scientific Co., Inc., Fairfax, Va., using the ASTM D-1331 and D-1590 procedures.

Viscosity: The ink viscosities were measured using a No. 1 and No. 2 shell cup from Norcross Corporation., Newton, Mass. using ASTM procedure D-4212.

Particle Diameter: The mean particle diameter and largest detectable diameter were measured using a MICROTRAC® Ultrafine Particle Analyzer from Leeds & Northrup Co., St. Petersburg, Fla. The following conditions were used: non-transparent, non-spherical particles; particle density=1.86 g/m$^3$; with water as the dispersing liquid. A run time of six minutes was used. (MICROTRAC is a registered trademark of Leeds & Northrup Co.)

Optical Density: The optical density was measured using a MACBETH RD-915 densitometer from Macbeth, New Windsor, N.Y. following ANSI procedure CGATS, 4-1993. (MACBETH is a registered trademark of Kollmorgen Instruments, Corporation)

Waterfastness: Ratio of Optical Density of the image after washing (with distilled water until no further inks is removed) to the Optical Density of the image before washing.

EXAMPLE 1

Preparation of Carbon Black Products

Example 1 involves the preparation of a variety of colorants useful in the ink compositions of the present invention.

A) 100 parts per hour of a carbon black having a BET surface area of 200 m$^2$/g and DBPA of 122 mL/100 g was charged in a contiuous pin mixer with 12.5 parts per hour of sulfanilic acid and 5.2 parts per hour of sodium nitrite as an aqueous solution. The resultant material was a mixture of the carbon black product having attached $C_6H_4SO_3^-Na^+$ groups and water containing 60% solids. The carbon black product was diluted with water and filtered before use.

B) An aqueous solution of 6.15 g NaNO$_2$ was added to a stirring mixture of 14 g of sulfanilic acid, 100 g of carbon black and 400 g of water to form an aqueous dispersion of the modified carbon black having attached $C_6H_4SO_3^-Na^+$ groups. The carbon black had a BET surface area of 140 m$^2$/g and a DBPA of 114 mL/100 g. After stirring for one hour, the resulting dispersion was filtered.

C) 100 parts per hour of carbon black having a CTAB surface area of 350 m$^2$/g and a DBPA of 120 mL/100 g was charged to a continuously operating pin mixer with 25 parts per hour of sulfanilic acid and 10 parts per hour of sodium nitrite as an aqueous solution. The resultant material was a mixture of the carbon black product having attached $C_6H_4SO_3^-Na^+$ groups and water containing 72% solids. The carbon black product was diluted with water and filtered before use.

D) In a pin mixer, 41.2 g of 4-aminobenzoic acid and 300 g of a carbon black with a BET surface area of 200 m$^2$/g and a DBPA of 122 mL/100 g were mixed. After mixing thoroughly, 150 g water, a solution of 20.7 g NaNO$_2$ in 100 g of water and then 50 g of water was added. The resultant dispersion was a mixture of carbon black product having attached $C_6H_4CO_2^-Na^+$ groups and water containing 56% solids.

E) Silver nitrite (30.9 g) was added to a solution of 41.4 g of N-(4-aminophenyl)pyridinium chloride in 700 g of water and the mixture was stirred at 70° C. for 1 ½ hours. The mixture was filtered and 200 g of a carbon black with a BET surface area of 200 m²/g and a DBPA of 122 mL/100 g was added. An additional one liter of water was added and 20 g of concentrated HCl was added. The dispersion was stirred at 70–80° C. for 2 ½ hours and then dried in an oven at 125° C. to form a dry carbon black product having attached $C_6H_4NC_5H_5^-$ groups.

F) Silver nitrite (8.31 g) was added to a solution of 11.2 g of N-(4-aminophenyl)pyridinium chloride in 250 g of water and the mixture was stirred at 70–80° C. for one hour and at room temperature overnight. The mixture was heated at 70–80° C. for an additional hour, cooled and filtered through a bed of diatomaceous earth. A portion of the resulting solution (53.5 g) was added to 10 g of a carbon black with a CTAB surface area of 108 m²/g and a DBPA of 116 mLI100 g. Approximately 35 g of water was added to the dispersion, followed by a solution of approximatley 0.7 g of concentrated HCl. The resulting dispersion was stirred at 70–90° C. for 2 hours and then dried in an oven at 125° C. to form a dry carbon black product having attached $C_6H_4NC_5H_5^+$ groups.

G) Silver nitrite (1.6 g) was added to a solution of 2.84 g of 4-aminophenyltrimethylammonium chloride in water and the mixture was boiled for one hour. The mixture was filtered and 10 g of a carbon black with a BET surface area of 200 m²/g and a DBPA of 122 mL/100 g was added. Additional water was added to bring the volume to about 100 mL, and 1.0 g of concentrated HCl was added. The dispersion was stirred at 80° C. for one hour. The resultant dispersion was a mixture of carbon black product having attached $C_6H_4N(CH_3)_3^+$ groups and water.

H) Silver nitrite (1.23 g) was added to a solution of 1.83 g of 4-aminophenacyltrimethyl ammonium chloride in water and the mixture was boiled for one hour. The mixture was filtered and 8 g of a carbon black with a BET surface area of 200 m²/g and a DBPA of 122 mL/100 g was added. Additional water was added to bring the volume of the mixture to about 80 mL. The mixture was heated to about 70° C. and 0.79 g of concentrated HCl was added with stirring. The dispersion was stirred at 70° C. for one hour. The resultant dispersion was a mixture of carbon black product having attached $C_6H_4COCH_2N(CH_3)_3^+$ groups and water.

EXAMPLE 2

Preparation of Polymers

Example 2 involves the preparation of a variety of polymers useful in the ink compositions of the present invention.

A) Polyvinylimidazole was prepared by adding ammonium persulfate (0.5 g) to a solution of 24 g 1-vinylimidazole in 225 g of water stirred at 70–90° C. A solution of 0.5 mercaptoethanol in 4 g of water was added over a period of one hour, and the solution was stirred for an additional 2 hours at 70–90° C. The product had a weight average Mw of 1100 as determined by gel permeation chromatography (GPC).

B) Polyvinylimidazole was prepared by adding ammonium persulfate (0.25 g) to a solution of 24 g 1-vinylimidazole in 225 g of water stirred at 70–90° C. A solution of 0.25 mercaptoethanol in 4 g of water was added over a period of 40 minutes, and the solution was stirred for an additional 4.5 hours at 80° C. The product had a weight average Mw of 900 by GPC.

C) Polyvinylimidazole was prepared by adding ammonium persulfate (0.5 g) to a solution of 24 g 1-vinylimidazole in 225 g of water stirred at 70–90° C. The solution was stirred for 4.5 hours at 80° C. The product had a weight average Mw of 800 by GPC.

D) Poly(vinylimidazole-co-vinylpyrrolidone) was prepared by adding ammonium persulfate (0.5 g) to a solution of 5 g 1-vinylimidazole and 20 g of N-vinylpyrrolidone in 60 g of water stirred at 65° C. A solution of 0.5 g mercaptoethanol in 4 g of water was added over a period of 45 minutes, and the solution was stirred for an additional 2 hours at 65° C. The product had a weight average Mw of 4,900 by GPC.

E) Poly(vinylimidazole-co-vinylpyrrolidone) was prepared by adding ammonium persulfate (0.5 g) to a solution of 12.5 g 1-vinylimidazole and 12.5 g of N-vinylpyrrolidone in 130 g of water stirred at 65° C. A solution of 0.5 g mercaptoethanol in 4 g of water was added over a period of 45 minutes, and the solution was stirred for an additional 2 hours at 65° C. The product had a weight average Mw of 1,500 by GPC.

F) Poly(vinylimidazole-co-vinylpyrrolidone) was prepared by adding 2,2'-Azo(2-bisamidinopropane) dihydrochloride (0.5 g) to a solution of 18.75 g 1-vinylimidazole and 6.25 g of N-vinylpyrrolidone in 160 g of water stirred at 70° C. A solution of 0.5 g mercaptoethanol in 3 g of water was added over a period of 40 minutes, and the solution was stirred for an additional 2.5 hours at 65° C. The product had a weight average Mw of 17,000 by GPC.

G) Poly(vinylpyridine-co-vinylpyrrolidone) was prepared by adding ammonium persulfate (0.5 g) to a mixture of 5 g 4-vinylpyridine and 20 g of N-vinylpyrrolidone in 60 g of water stirred at 65° C. A solution of 0.5 g mercaptoethanol in 4 g of water was added over a period of 30 minutes, and the solution was stirred for an additional 2 hours at 65° C. The product had a weight average Mw of 24,000 by GPC.

H) Poly(vinylpyridine-co-vinylpyrrolidone) was prepared by adding ammonium persulfate (0.5 g) to a mixture of 12.5 g 4-vinylpyridine and 12.5 g of N-vinylpyrrolidone in 40 g of water stirred at 65° C. A solution of 0.5 g mercaptoethanol in 4 g of water was added over a period of 20 minutes, and the solution was stirred for an additional 1.5 hours at 65° C. Methanol (2 mL) was added and the solution was stirred for an additional 2 hours. The product had a weight average Mw of 30,000 by GPC.

I) Poly(vinylpyridine-co-vinylpyrrolidone) was prepared by adding ammonium persulfate (0.5 g) to a solution of 2.5 g 4-vinylpyridine and 22.5 g of N-vinylpyrrolidone in 50 g of water stirred at 65 C. A solution of 0.5 g mercaptoethanol in 4 g of water was added over a period of 30 minutes, and the solution was stirred for an additional 2.5 hours at 65° C. The product had a weight average Mw of 33,000 by GPC.

J) Poly(vinylpyridine-co-vinylpyrrolidone) was prepared by adding ammonium persulfate (0.5 g) to a solution of 1.25 g 4-vinylpyridine and 23.75 g of N-vinylpyrrolidone in 50 g of water stirred at 65° C. A solution of 0.5 g mercaptoethanol in 4 g of water was added over a period of 30 minutes, and the solution was stirred for an additional 2.5 hours at 65° C. The product had a weight average Mw of 18,000 by GPC.

K) Poly(vinylimidazole-co-vinylpyridine) was prepared by adding ammonium persulfate (0.5 g) to a solution of 23.7 g 1-vinylimidazole and 1.3 g 4-vinylpyridine in 215 g of water stirred at 65° C. A solution of 0.5 g mercaptoethanol in 4 g of water was added over a period of 40 minutes, and the solution was stirred for an additional 2.5 hours at 65° C. The product had a weight average Mw of 1,900 by GPC.

Preparation of Ink Compositions

Examples 3 through 26 are illustrations of the ink composition of the present invention. Once prepared, all inks of Examples 3–17 and 21–26 were drawn down as a film using a 3 mil Bird applicator and allowed to dry for 10 minutes in Examples 3–11 and 15 minutes in Examples 12–27. A portion of the image or print was rinsed with a stream of water until no additional ink washed off. After air drying for approximately 10–15 minutes, the optical densities, as determined below, of the washed and unwashed portions were measured to determine the percent of waterfastness. The ink compositions of Examples 18–20 were placed into empty ink jet cartridges (No. 51626A type), printed with a Hewlett-Packard DeskJet® 540 ink jet ink printer, then similarly tested for waterfastness using the procedure described above for the drawdowns.

EXAMPLE 3

Seven samples of ink jets inks were prepared by adding the polymer solutions prepared in Example 2A–2F to aqueous dispersions of the carbon black product prepared in Example 1A. The ink had a carbon black product concentration of 7% by weight, based on dry black. The relevant properties of the ink and drawdowns produced therefrom are illustrated below.

| Sample | Polymer No. | Polymer concentration (wt %) | Carbon black particle size in ink, $\mu$ | Optical density before washing | Optical density after washing | Waterfastness (% retained) |
|---|---|---|---|---|---|---|
| 1 (control) | N/A | 0.0 | 0.13 | 1.49 | 1.20 | 81 |
| 2 | 2A | 1.75 | 0.12 | 1.45 | 1.36 | 94 |
| 3 | 2B | 1.75 | 0.13 | 1.45 | 1.35 | 93 |
| 4 | 2C | 1.75 | 0.13 | 1.46 | 1.35 | 92 |
| 5 | 2D | 1.75 | 0.13 | 1.52 | 1.21 | 80 |
| 6 | 2E | 1.75 | 0.12 | 1.48 | 1.22 | 82 |
| 7 | 2F | 1.75 | 0.18 | 1.52 | 1.52 | 100 |

With the exception of Sample 5, all of the images prepared from the ink compositions of the present invention demonstrated improved waterfastness, as compared to the control sample 1.

EXAMPLE 4

Seven samples of ink jet inks were prepared by dissolving the polymer of Example 2A and ammonium toluenesulfonate in aqueous dispersions of the carbon black product prepared in Example 1A. The concentration of the polymer was varied. The ink had a carbon black product concentration of 7%, by weight, based on dry black. The relevant properties of the ink and drawdowns produced therefrom are illustrated below.

| Sample | Polymer Concentration (wt %) | Ammonium toluene sulfonate concentration, M | Optical density before washing | Optical density after washing | Waterfastness (% retained) |
|---|---|---|---|---|---|
| 1 (Control) | 0 | 0.00 | 1.49 | 1.20 | 81 |
| 2 | 0.88 | 0.04 | 1.52 | 1.42 | 93 |
| 3 | 1.75 | 0.02 | 1.51 | 1.45 | 96 |
| 4 | 1.75 | 0.04 | 1.50 | 1.48 | 99 |
| 5 | 1.75 | 0.06 | 1.51 | 1.48 | 98 |
| 6 | 1.75 | 0.00 | 1.51 | 1.42 | 94 |
| 7 | 3.50 | 0.04 | 1.48 | 1.48 | 100 |

Samples 2 through 7 illustrated that the addition of a polymer and a salt may further be used to improve the waterfastness of the images prepared from the ink compositions of the present invention, as compared to the control sample 1.

EXAMPLE 5

Twelve samples of ink jet inks were prepared by dissolving the polymer of Example 2A and various salts in aqueous dispersions of the carbon black product prepared in Example 1A. The concentration of the polymer, added salt, and carbon black product in all inks were 1.75 wt %, 0.04 M, and 7 wt %, respectively. The relevant properties of the inks and drawdowns produced therefrom are shown below.

| Sample | Salt | Optical density before washing | Optical density after washing | Waterfastness (% retained) |
|---|---|---|---|---|
| 1 | None | 1.51 | 1.42 | 94 |
| 2 | Ammonium chloride | 1.48 | 1.48 | 100 |
| 3 | Ammonium nitrate | 1.48 | 1.47 | 99 |
| 4 | Ammonium sulfate | 1.43 | 1.40 | 98 |
| 5 | Ammonium propionate | 1.52 | 1.50 | 99 |
| 6 | Ammonium benzoate | 1.50 | 1.49 | 99 |
| 7 | Ammonium phenylacetate | 1.48 | 1.47 | 99 |
| 8 | Triethylammonium toluenesulfonate | 1.49 | 1.45 | 97 |
| 9 | Dipropylammonium toluenesulfonate | 1.47 | 1.44 | 98 |
| 10 | (2-Hydroxyethyl)-dimethylammonium toluenesulfonate | 1.44 | 1.41 | 98 |
| 11 | Piperidinium toluenesulfonate | 1.47 | 1.40 | 95 |
| 12 | Butylammonium toluenesulfonate | 1.49 | 1.36 | 91 |

This example illustrated that various salts, in conjunction with the polymer, may be used to produce images with good or enhanced degrees of waterfastness.

EXAMPLE 6

Nine samples of ink jet inks were prepared by dissolving the polymer of Example 2A and various salts in aqueous dispersions of the carbon black product prepared in Example 1A. The carbon black concentration was 10 wt %. The concentrations of the other components and relevant properties are shown below.

| Sample | Salt | Added salt conc. M. | Polymer conc. (wt %) | Optical density before washing | Optical density after washing | Waterfastness (% retained) |
|---|---|---|---|---|---|---|
| 1 (Control) | None | 0.00 | 0.0 | 1.56 | 1.18 | 76 |
| 2 | None | 0.00 | 2.5 | 1.46 | 1.37 | 94 |
| 3 | Ammonium acetate | 0.32 | 2.5 | 1.53 | 1.52 | 99 |
| 4 | Ammonium acetate | 0.04 | 2.5 | 1.52 | 1.40 | 92 |
| 5 | Ammonium methanesulfonate | 0.04 | 2.5 | 1.52 | 1.40 | 92 |
| 6 | Ammonium toluenesulfonate | 0.04 | 2.5 | 1.53 | 1.45 | 95 |
| 7 | Trimethylammonium acetate | 0.04 | 2.5 | 1.49 | 1.38 | 93 |
| 8 | Trimethylammonium methanesulfonate | 0.04 | 2.5 | 1.52 | 1.38 | 91 |
| 9 | Trimethylammonium toluenesulfonate | 0.04 | 2.5 | 1.46 | 1.40 | 96 | amples 2 through 9 demonstrated that the ink compositions, with or without the further addition of a salt, produce images having an improved degree of waterfastness, as compared to the control sample 1.

EXAMPLE 7

Five samples of ink jet inks were prepared by dissolving the polymers of Examples 2A and 2C-2E, and ammonium phenylacetate in aqueous dispersions of the carbon black product prepared in Example 1A. The concentration of the polymer, ammonium phenylacetate and carbon black product were 1.75 wt %, 0.04 M, and 7 wt %, respectively.

| Sample | Polymer No. | Optical density before washing | Optical density after washing | Waterfastness (% retained) |
|---|---|---|---|---|
| 1 | None | 1.49 | 1.20 | 81 |
| 2 | 2A | 1.48 | 1.47 | 99 |
| 3 | 2C | 1.52 | 1.42 | 93 |
| 4 | 2D | 1.51 | 1.31 | 87 |
| 5 | 2E | 1.50 | 1.37 | 91 |

The images prepared from the ink compositions in this Example containing a polymer and salt all demonstrated good or enhanced waterfast qualities.

EXAMPLE 8

Nine samples of ink jet inks were prepared by dissolving the polymer of Example 2A and ammonium benzoate in aqueous dispersions of carbon black products prepared in Examples 1A–1D. The concentration of the carbon black products were 7 wt %. The relevant properties of the inks and drawdowns produced therefrom are shown below.

| Sample | Carbon black product no. | Polymer concentration (wt %) | Ammonium benzoate concentration M | Optical density before washing | Optical density after washing | Waterfastness (% retained) |
|---|---|---|---|---|---|---|
| 1 (control) | 1A | 0.00 | 0.00 | 1.49 | 1.20 | 81 |
| 2 | 1A | 1.75 | 0.04 | 1.50 | 1.46 | 97 |

-continued

| Sample | Carbon black product no. | Polymer concentration (wt %) | Ammonium benzoate concentration M | Optical density before washing | Optical density after washing | Waterfastness (% retained) |
|---|---|---|---|---|---|---|
| 3 (control) | 1B | 0.00 | 0.00 | 1.55 | 1.25 | 81 |
| 4 | 1B | 1.75 | 0.04 | 1.64 | 1.62 | 99 |
| 5 (control) | 1C | 0.00 | 0.00 | 1.35 | 0.80 | 59 |
| 6 | 1C | 1.75 | 0.04 | 1.35 | 1.18 | 87 |
| 7 (control) | 1D | 0.00 | 0.00 | 1.67 | 1.38 | 83 |
| 8 | 1D | 1.75 | 0.00 | 1.64 | 1.63 | 99 |
| 9 | 1D | 1.75 | 0.04 | 1.68 | 1.68 | 100 |

As noted from the above table, various carbon black products may be used in the ink compositions of the present invention to generate images having improved waterfastness, as compared to the controls of samples 1, 3, 5 and 7. In addition, the use of a salt may further enhance such waterfastness.

EXAMPLE 9

Ink jet inks were prepared by dissolving various polymers in aqueous dispersions of the carbon black products prepared in Examples 1E–1H. The polymers were prepared in Example 2 unless otherwise indicated. The pH of the ink was adjusted in some cases with HCl or NaOH. The relevant properties of the inks and drawdowns produced therefrom are shown below.

| Dye | Dye concentration (wt %) | Polymer | Polymer concentration (wt %) | Ammonium benzoate concentration M | Optical density before washing | Optical density after washing | Waterfastness (% retained) |
|---|---|---|---|---|---|---|---|
| A | 4 (control) | NONE | 0 | 0 | 1.10 | 0.70 | 64 |
| A | 4 | 2A | 1 | 0 | 1.13 | 1.03 | 91 |
| A | 4 | 2A | 1 | 0.04 | 1.15 | 0.98 | 85 |
| A | 4 | 2D | 1 | 0 | 1.19 | 0.90 | 76 |
| A | 4 | 2E | 1 | 0 | 1.22 | 1.05 | 86 |
| B | 5 (control) | NONE | 0 | 0 | 1.24 | 0.85 | 69 |
| B | 5 | 2A | 1 | 0 | 1.25 | 0.75 | 60 |
| B | 5 | 2A | 1 | 0.04 | 1.21 | 0.90 | 74 |
| B | 5 | 2A | 2 | 0 | 1.40 | 1.10 | 79 |
| B | 5 | 2A | S | 0 | 1.32 | 1.10 | 83 |

A = Pro-Jet ™ Fast Black 2 (available from Zeneca, Ltd.)
B = Direct Black 19 (available from Aakash Chemicals & Dystuff, Inc., Addison, IL)

This Example illustrated that various carbon black products containing cationic groups in conjunction with a PVI or PEI based polymer are useful for improving the waterfastness of images generated from the ink compositions of the present invention. In addition, the ink compositions are useful over a wide range of pH. It will be recognized, however, by those skilled in the art that the pH of the composition may need to be adjusted in order for such composition to be useful in a particular end product application.

EXAMPLE 10

Ink jet inks were prepared by adding solutions of vinylpyridine copolymers to aqueous dispersions of the carbon black product of Example 1A. The concentration of the carbon black product was 7%. Methanol or ammonium benzoate was added to some inks as shown. The relevant properties of the inks and drawdowns produced therefrom are shown below.

| Polymer No. | Polymer concentration wt % | Carbon black median diam. in ink, $\mu$ | Optical density before washing | Optical density after washing | Waterfastness (% retained) |
|---|---|---|---|---|---|
| N/A | — | 0.13 | 1.49 | 1.20 | 81 |
| 2G | 1.75 | 0.24 | 1.49 | 1.47 | 99 |
| 2G | 1.75* | 0.22 | 1.52 | 1.50 | 99 |
| 2H | 1.75* | 0.23 | 1.52 | 1.52 | 100 |
| 2I | 1.75 | 2.0 | 1.52 | 1.51 | 99 |
| 2J | 1.75 | 0.27 | 1.54 | 1.33 | 86 |
| 2J | 1.75** | 0.99 | 1.47 | 1.47 | 100 |

-continued

| Polymer No. | Polymer concentration wt % | Carbon black median diam. in ink, $\mu$ | Optical density before washing | Optical density after washing | Waterfastness (% retained) |
|---|---|---|---|---|---|
| 2K | 1.75 | 0.28 | 1.59 | 1.43 | 90 |
| 2K | 1.75** | 0.51 | 1.49 | 1.47 | 99 |

*Also contains 5% methanol
**Also contains 0.04M ammonium benzoate

The above results illustrated that vinylpyridine copolymers were also useful to produce images from the ink compositions having improved waterfastness. It in noted that some of the inks may have limited application because of the particle size. In these instances, it has been found that additional filtering of the inks may be desired.

EXAMPLE 11

Aqueous inks of the present invention were prepared utilizing a dye-based colorant and the polymer of Examples 2A, 2D and 2E. The composition of the inks and relevant properties from the drawdowns produced therefrom are listed below.

| Dye | Dye concentration (wt %) | Polymer | Polymer concentration (wt %) | Ammonium benzoate concentration M | Optical density before washing | Optical density after washing | Waterfastness (% retained) |
|---|---|---|---|---|---|---|---|
| A | 4 (control) | NONE | 0 | 0 | 1.10 | 0.70 | 64 |
| A | 4 | 2A | 1 | 0 | 1.13 | 1.03 | 91 |
| A | 4 | 2A | 1 | 0.04 | 1.15 | 0.98 | 85 |
| A | 4 | 2D | 1 | 0 | 1.19 | 0.90 | 76 |
| A | 4 | 2E | 1 | 0 | 1.22 | 1.05 | 86 |
| B | 5 (control) | NONE | 0 | 0 | 1.24 | 0.85 | 69 |
| B | 5 | 2A | 1 | 0 | 1.25 | 0.75 | 60 |
| B | 5 | 2A | 1 | 0.04 | 1.21 | 0.90 | 74 |
| B | 5 | 2A | 2 | 0 | 1.40 | 1.10 | 79 |
| B | 5 | 2A | 5 | 0 | 1.32 | 1.10 | 83 |

A = Pro-Jet ™ Fast Black 2 (available from Zeneca, Ltd.)
B = Direct Black 19 (available from Aakash Chemicals & Dystuff, Inc., Addison, IL)

The results indicated that polymers and copolymers of vinylimidazole may be used to improve the degree of waterfastness in images produced from dye-based colorants in accordance with the present invention.

EXAMPLE 12

An ink composition was prepared by admixing 5% by weight of the carbon black of Example 1A, 5% by weight of polyethyleneimine (available from Polysciences, Inc.) having a molecular weight of 600, and a balance of distilled water. The ink had a pH of 11.7, a viscosity of 1.80 cP, and a surface tension of 74.0 dyne/cm. The resulting ink drawdown on Xerox 4024 paper had a waterfastness of 100%. For comparative purposes a similar ink composition was prepared by repeating the above procedure with the exception that 0% by weight of the polyethyleneimine and 95% of distilled water were selected. The ink had a pH of 8.2, a viscosity of 1.43 cP, and a surface tension of 74.1 dyne/cm. The waterfastness of a drawdown made from this second ink on Xerox 4024 paper was 94%. Other relevant properties are listed below.

| PEI (% of ink) | Optical density before washing | Optical density after washing | Waterfastness (% retained) | pH | Viscosity (cP) | Surface Tension |
|---|---|---|---|---|---|---|
| 0 | 1.38 | 1.30 | 94 | 8.2 | 1.43 | 74.1 |
| 5 | 1.31 | 1.31 | 100 | 11.7 | 1.80 | 74.0 |

EXAMPLE 13

Ink compositions were prepared by repeating the procedure of Example 12 with the exception that there was selected 0.02 to 5% by weight of the polyethyleneimine having a MW of 600. The waterfastness of the drawdowns, prepared as described in Example 12, made from the inks ranged between 99 and 100%. The relevant ink properties and waterfastness of the drawdowns generated therefrom are listed below:

| PEI % of ink | Optical density before washing | Optical density after washing | Waterfastness (% retained) | pH | Viscosity (cP) | Surface Tension (dyne/cm) |
|---|---|---|---|---|---|---|
| 0.0 (control) | 1.38 | 1.30 | 94 | 8.2 | 1.43 | 74.1 |
| 0.02 | 1.36 | 1.36 | 100 | 11.0 | 1.56 | 75.1 |
| 0.2 | 1.38 | 1.37 | 99 | 11.5 | 1.43 | 75.2 |
| 0.5 | 1.40 | 1.36 | 97 | 11.6 | 1.41 | 75.0 |
| 1 | 1.35 | 1.35 | 100 | 11.6 | 1.37 | 75.5 |
| 5 | 1.31 | 1.31 | 100 | 11.7 | 1.80 | 74.0 |

All of images produced from the inks in Example 13 at various concentrations of PEI had higher waterfastness values compared to that of the ink composition of Example 12 with 0% poly(ethyleneimine) having a waterfastness of 94%.

EXAMPLE 14

Inks compositions were prepared by repeating the procedure of Example 12 with the exception that there was selected 0.02 to 5% by weight of poly(ethyleneimine) with a molecular weight of 1,200 in place of poly(ethyleneimine) having a molecular weight of 600. The waterfastness of the drawdowns produced the inks having poly(ethyleneimine) with a molecular weight of 1,200 range between 99% to 100%. The relevant ink properties and waterfastness of the drawdowns generated therefrom are listed below:

| PEI (% of ink) | Optical density before washing | Optical density after washing | Waterfastness (% retained) | pH | Viscosity (cP) | Surface Tension (dyne/cm) |
|---|---|---|---|---|---|---|
| 0 | 1.38 | 1.30 | 94 | 8.2 | 1.43 | 74.1 |
| 0.02 | 1.39 | 1.39 | 100 | 11.0 | 1.40 | 75.0 |
| 0.2 | 1.42 | 1.40 | 99 | 11.5 | 1.34 | 75.1 |
| 0.5 | 1.37 | 1.36 | 99 | 11.6 | 1.37 | 75.0 |
| 1 | 1.37 | 1.37 | 100 | 11.7 | 1.41 | 74.8 |

-continued

| PEI (% of ink) | Optical density before washing | Optical density after washing | Waterfastness (% retained) | pH | Viscosity (cP) | Surface Tension (dyne/cm) |
|---|---|---|---|---|---|---|
| 3 | 1.33 | 1.34 | 100 | 11.7 | 1.66 | 74.4 |
| 5 | 1.32 | 1.36 | 100 | 11.7 | 1.71 | 74.0 |

This example illustrated that various concentration of PEI may be used to improve the waterfastness of the images produced from the ink compositions of the present invention.

EXAMPLE 15

The inks were prepared by repeating the procedure of Example 12 with the exception that there was selected 0.02 to 1% by weight of polyethyleneimine having a molecular weight of 2,000. The waterfastness of drawdowns made from the inks ranged between 98 and 100%. The waterfastness and other ink properties are listed below.

| PEI (% of ink) | Optical density before washing | Optical density after washing | Waterfastness (% retained) | pH | Viscosity (cP) | Surface Tension (dyne/cm) |
|---|---|---|---|---|---|---|
| 0 | 1.38 | 1.30 | 94 | 8.2 | 1.43 | 74.1 |
| 0.02 | 1.39 | 1.40 | 100 | 10.5 | 1.58 | 75.0 |
| 0.2 | 1.39 | 1.40 | 100 | 11.3 | 1.54 | 75.1 |
| 0.5 | 1.40 | 1.38 | 99 | 11.3 | 1.43 | 75.0 |
| 1 | 1.44 | 1.41 | 98 | 11.1 | 1.48 | 75.0 |

Similar to Example 14, the above table further illustrated that various concentrations of PEI may be used to improve the waterfastness of images produced from the ink compositions of the present invention.

EXAMPLE 16

An ink was prepared by repeating the procedure of Example 12 with the exception that 0.02% by weight of ethoxylated polyethyleneimine having a molecular weight of 50,000 from Aldrich Chemical Co. was selected in place of the polyethyleneimine having a molecular weight of 600. A sufficient amount of dimethylethanolamine (available from Aldrich Chemical Co.) was added to raise the pH of the ink to 11.2. The waterfastness of the drawdown made from the ink containing the polyethyleneimine having a molecular weight of 50,000 was 98% (Optical density before washing=1.37; Optical density after washing=1.34). The viscosity of the ink was 1.45 cP, the surface tension was 75.0 dynes/cm, and the pH was 11.2.

EXAMPLE 17

An ink was prepared by mixing 5% by weight of the carbon black product of Example 1A, 0.02% by weight hydroxylated polyethyleneimine having a molecular weight of 2,000 obtained from Polysciences, Inc., and a balance of distilled water. The pH of the ink was adjusted to about 11.0 with a small amount of N,N-dimethylethanolamine from Aldrich Chemical Co. The waterfastness of the resulting drawdown, was determined to be 96% (Optical density before washing=1.36; Optical density after washing=1.33). The ink had a viscosity of 1.79 cP, a surface tension of 72.8 dynes/cm, and a pH of 11.0.

EXAMPLE 18

An ink jet ink was prepared by admixing 5% by weight of carbon black product prepared in Example 1A, 10% by weight of ethylene glycol (a humectant) from Aldrich Chemical Co., 5% by weight of poly(ethyleneimine) obtained from Polysciences, Inc. having a molecular weight of 600, and a balance of distilled water. The print obtained using the ink on Xerox 4024 paper had a waterfastness of 100%. Other properties are shown below. For comparative purposes, another ink was made by admixing 5% by weight of the carbon black product prepared in Example 1A, 10% by weight of ethylene glycol, 0% by weight of polyethyleneimine, and a balance of distilled water. The waterfastness of the print made from the ink having 0% by weight of polyethyleneimine on Xerox 4024 paper was determined to be 87%, and other ink properties are shown below.

| PEI (% of ink) | Viscosity (cP) | Surface Tension (dynes/cm) | Optical Density Before Washing | Optical Density After Washing | Waterfastness (% retained) | pH |
|---|---|---|---|---|---|---|
| 5% | 2.05 | 70.0 | 1.36 | 1.35 | 100 | 11.6 |
| 0% | 1.48 | 71.2 | 1.42 | 1.23 | 87 | 7.6 |

EXAMPLE 19

Ink jets inks were made by repeating the procedure of Example 18 with the exception that the polyethyleneimine had molecular weights of 1200 and 2000. The concentrations and molecular weights of the polyethyleneimine used in the ink composition and the waterfastness obtained from the prints of the inks using the procedure of Example 14 are listed below:

| MW of PEI | PEI (% in ink) | Optical Density before washing | Optical Density after washing | Waterfastness (% retained) | viscosity (cP) | surface tension (dynes/cm) | pH |
| --- | --- | --- | --- | --- | --- | --- | --- |
| 1200 | 5 | 1.35 | 1.37 | 100% | 2.19 | 71 | 11.6 |
| 2000 | 1 | 1.43 | 1.41 | 99% | 1.99 | 72.6 | 11.0 |

EXAMPLE 20

Ink jets inks were made by repeating the procedure of Example 18 with the exception that the 0.02% by weight of hydroxylated polyethyleneimine having a molecular weight of 2000 was selected in place of polyethyleneimine and the pH of the ink was adjusted to 11.0 by addition of a small amount of N,N-dimethylethanolamine. The waterfastness of a print using the procedure of Example 18 made from the 0.02% by weight of hydroxylated polyethyleneimine was 89% (Optical density before washing=1.38; Optical density after washing=1.31). The ink had a viscosity of 1.79 cP, a surface tension of 72.8 dynes/cm, and a pH of 11.0. As noted, the print made from the ink containing the PEI polymer was 89% waterfast, as compared to the 87% waterfast of the print made from the ink without the PEI polymer (see Example 18 above, 0% PEI).

EXAMPLE 21

To illustrate that the ink compositions may be useful with various papers, ink jet inks were prepared as described in Example 12, with the exception that 0.5% of polyethyleneimine having a molecular weight of 600 by weight was used. For comparative purposes, a similar ink without the polyethyleneimine was also prepared. The papers utilized were Xerox® 4024 (from Xerox Corporation), Nashua DB-500 (from Nashua Corporation), and Neenah® Bond (from Kimberly-Clark Corp.). The surface pH of the papers, given by the Nashua Corporation and Kimberly Clark Corporation, in addition to being measured with an universal buffer from Fisher Chemical Co., and the waterfastness of drawdowns made from the ink with and without the PEI are listed below:

| PEI (% in ink) | Paper | Surface pH of Paper | Optical Density before washing | Optical Density after washing | Waterfastness (% retained) |
| --- | --- | --- | --- | --- | --- |
| 0.0 | Xerox 4024 | 6 | 1.40 | 1.36 | 94 |
| 0.0 | Nashua DB-500 | 7 | 1.32 | 1.00 | 76 |
| 0.0 | Neenah Bond | 4.5–5 | 1.34 | 1.19 | 89 |
| 0.5 | Xerox 4024 | 6 | 1.47 | 1.49 | 100 |
| 0.5 | Nashua DB-500 | 7 | 1.53 | 1.51 | 97 |
| 0.5 | Neenah Bond | 4.5–5 | 1.40 | 1.39 | 99 |

EXAMPLE 22

An ink composition was prepared having 5% by weight of the carbon black product of Example 1F, 0.5% by weight of polyethyleneimine having a molecular weight of 600, and the balance distilled water to form an ink. The waterfastness of the drawdown formed from the ink, on Xerox 4024 paper, was 100%. A similar ink composition was prepared by repeating the above procedure with the exception that 0% by weight of the polyethyleneimine was used. The waterfastness of the drawdown made with this ink, i.e. without PEI, on Xerox 4024 paper, was 95%. Other relevant properties are as follows.

| PEI (% of ink) | Viscosity (cP) | Surface Tension (dynes/cm) | Optical Density before washing | Optical Density after washing | Waterfastness (% retained) | pH |
| --- | --- | --- | --- | --- | --- | --- |
| 0.5% | 1.29 | 75.0 | 1.46 | 1.46 | 100% | 7.9 |
| 0.0% | 1.24 | 75.2 | 1.34 | 1.27 | 95% | 2.4 |

As noted above, the waterfastness of the images produced from the ink made in accordance with the present invention was improved.

EXAMPLE 23

An ink jet ink was prepared by repeating the procedure of Example 22 with the exception that 0.5% by weight of polyethyleneimine having a molecular weight of 2000 was used in place of the polyethyleneimine having a molecular weight of 600. The waterfastness of the drawdown made with ink having the 2000 molecular weight polyethyleneimine, on Xerox 4024 paper, was 100% (Optical density before washing=1.48; Optical density after washing=1.49). The ink had a viscosity of 1.39 cP, a surface tension of 74.6 dynes/cm, and a pH of 9.4.

EXAMPLE 24

An ink jet ink was prepared by repeating the procedure of Example 22 with the exception that 0.02% by weight of a hydroxyethylated polyethyleneimine having a molecular weight of 2000 was used in place of the polyethyleneimine having a molecular weight of 600. The waterfastness of the drawdown made from this ink, on Xerox 4024 paper was 100% (Optical density before washing=1.43; Optical density after washing=1.44). The ink had a viscosity of 1.32 cP, a surface tension of 74.8 dynes/cm, and a pH of 2.6.

EXAMPLE 25

Five percent by weight of the carbon black product of Example ID, 0.5% by weight of polyethyleneimine having a molecular weight of 600, and the balance distilled water were mixed to form an ink. The waterfastness of the drawdown produced from the ink, on Nashua DB-500 paper, was 94% (Optical density before washing=1.54; Optical density after washing=1.44). A similar ink composition was prepared by repeating the above procedure with the exception that 0% by weight of the polyethyleneimine was used. The waterfastness of the drawdown made from ink containing 0% polyethyleneimine, on Nashua DB-500 paper, was 82%. Other properties are as follows:

| PEI (% of ink) | Viscosity (cP) | Surface Tension (dynes/cm) | Waterfastness (% retained) | pH |
| --- | --- | --- | --- | --- |
| 0.5% | 1.49 | 75.2 | 94 | 11.4 |
| 0% | 1.39 | 75.1 | 82 | 7.8 |

EXAMPLE 26

An ink jet ink was prepared by repeating the procedure of Example 25 with the exception that 0.5% by weight of polyethyleneimine having a molecular weight of 2000 was used in place of the poly(ethyleneimine) having a molecular weight of 600. The waterfastness of the drawdown made from the ink, on Nashua DB-500 paper, was 99% (Optical density before washing=1.64; Optical density after washing=1.62). The ink had a viscosity of 1.46 cP, a surface tension of 74.5 dynes/cm, and a pH of 10.7.

EXAMPLE 27

An ink jet ink was prepared by repeating the procedure of Example 25 with the exception that 0.02% by weight of hydroxylated polyethyleneimine having a molecular weight of 2000 was used in place of the polyethyleneimine having a molecular weight of 600. The waterfastness of the drawdowns made from the ink, on Nashua DB-500 paper, was 92% (Optical density before washing=1.54; Optical density after washing=1.42). The ink had a viscosity of 2.85 cP, a surface tension of 75.0 dynes/cm, and a pH of 8.1.

As noted above, the ink compositions of the present invention may be useful in a wide variety of printing applications and, in particular, ink jet printing applications. The compositions provide high print quality and rapid drying when employed in conventional printing processes, such as in thermal ink jet printers.

The foregoing description of preferred embodiments of the invention has been presented for purposes of illustration and description. It is not intended to be exhaustive or to limit the invention to the precise form disclosed, and modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An ink composition, comprising a pigment and a polymer selected from the group consisting of polyvinylimidazole, derivatives of polyvinylimidazole, copolymers of vinylimidazole and copolymers of vinylimidazole derivatives, wherein said polymer is soluble in said ink composition.

2. The ink composition of claim 1, wherein said ink composition is an aqueous ink composition.

3. The ink composition of claim 1, wherein said polyvinylimidazole is poly-N-vinylimidazole.

4. The ink composition of claim 1, wherein the polymer comonomer of said copolymer of polyvinylimidazole is selected from the group consisting of acrylate esters, acrylate amides, methacrylate esters, methacrylate amides, acrylonitrile, vinyl pyrrolidone, and vinyl chloride.

5. The ink composition of claim 1, wherein said polymer has a weight average molecular weight less than 50,000.

6. The ink composition of claim 5, wherein said polymer has a weight average molecular weight less than 30,000.

7. The ink composition of claim 1, further comprising a dye.

8. The ink composition of claim 1, wherein said pigment is a carbon black.

9. The ink composition of claim 1, wherein said pigment is a charged carbon black.

10. The ink composition of claim 1, wherein said pigment is a charged, modified carbon black having at least one attached organic group.

11. The ink composition of claim 9, wherein said carbon black is negatively charged.

12. The ink composition of claim 9, wherein said carbon black is positively charged.

13. The ink composition of claim 10, wherein said organic group of said carbon black is selected from the group consisting of $C_6H_4SO_3^-M^+$, $C_6H_4CO_2^-M^+$, $C_6H_4N(CH_3)_3^+X^-$, $C_6H_4COCH_2N(CH_3)_3^+X^-$, and $C_6H_4(NC_5H_5)^+X^-$, wherein $M^+$ is $Na^+$, $K^+$, or $Li^+$ and $X^-$ is a monovalent anion.

14. The ink composition of claim 1, wherein said pigment is a charged, finely divided carbon product.

15. The ink composition of claim 7, wherein said dye is soluble in said ink composition.

16. The ink composition of claim 15, wherein said dye is selected from the group consisting of Direct Dyes, Acid Dyes, and Food Dyes.

17. The ink composition of claim 1, further comprising an ammonium salt.

18. The ink composition of claim 17, wherein said ammonium salt has a positive ion selected from the group consisting of ammonium, alkyl ammonium, dialkyl ammonium, trialkyl ammonium, arylalkyl ammonium, cyclic ammonium, and cyclic alkyl ammonium, and a negative ion selected from the group consisting of alkanoate, cycloalkyl carboxylate, aromatic carboxylate, arylalkyl carboxylate, alkylaryl carboxylate, sulfonate, and anions derived from a mineral acid.

19. The ink composition of claim 18, wherein said ammonium ion is selected from the group consisting of ammonium, methylammonium, diethylammonium, trimethylammonium, triethylammonium, benzylammonium, piperidinium, and pyrrolidinium, and said anion is selected from the group consisting of acetate, propionate, butyrate, cyclohexanecarboxylate, benzoate, phenyl acetate, methane sulfonate, benzene sulfonate, and toluene sulfonate.

20. The ink composition of claim 1, where said ink is suitable as an ink jet ink.

21. The ink composition of claim 1, wherein said polymer is present in an amount sufficient to improve the waterfastness of an image generated from said ink composition.

22. An ink composition, comprising a pigment and at least one polymer selected from the group consisting of polyvinylpyridine, derivatives of polyvinylpyridine, copolymers of vinylpyridine and copolymers of vinylpyridine derivatives, wherein said polymer is soluble in said ink composition.

23. The ink composition of claim 22, wherein said ink composition is an aqueous ink composition.

24. The ink composition of claim 22, wherein the polymer comonomer of said copolymer of vinylpyridine is selected from the group consisting of acrylate esters, acrylate amides, methacrylate esters, methacrylate amides, acrylonitrile, vinyl pyrrolidone, and vinyl chloride.

25. The ink composition of claim 22, wherein said polymer has a weight average molecular weight less than 50,000.

26. The ink composition of claim 22, wherein said polymer has a weight average molecular weight less than 30,000.

27. The ink composition of claim 2, further comprising a dye.

28. The ink composition of claim 22, wherein said pigment is a carbon black.

29. The ink composition of claim 22, wherein said pigment is a charged carbon black.

30. The ink composition of claim 22, wherein said pigment is a charged, modified carbon black having at least one attached organic group.

31. The ink composition of claim 19, wherein said charged carbon black is negatively charged.

32. The ink composition of claim 29, wherein said charged carbon black is positively charged.

33. The ink composition of claim 26, wherein said organic group of said carbon black is selected from the group consisting of $C_6H_4SO_3^-M^+$, $C_6H_4CO_2^-M^+$, $C_6H_4N(CH_3)_3^+X^-$, $C_6H_4COCH_2N(CH_3)_3^+X^-$, and $C_6H_4(NC_5H_5)^+X^-$, wherein $M^+$ is $Na^+$, $K^+$, or $Li^+$ and $X^-$) is a monovalent anion.

34. The ink composition of claim 22, wherein said pigment is a charged, finely divided carbon product.

35. The ink composition of claim 22, wherein said dye is soluble in said ink composition.

36. The ink composition of claim 35, wherein said dye is selected from the group consisting of Direct Dyes, Acid Dyes, and Food Dyes.

37. The ink composition of claim 22, further comprising an ammonium salt.

38. The ink composition of claim 37, wherein said ammonium salt has a positive ion selected from the group consisting of ammonium, alkyl ammonium, dialkyl ammonium, trialkyl ammonium, arylalkyl ammonium, cyclic ammonium, and cyclic alkyl ammonium, and a negative ion selected from the group consisting of alkanoate, cycloalkyl carboxylate, aromatic carboxylate, arylalkyl carboxylate, alkylaryl carboxylate, sulfonate, and anions derived from a mineral acid.

39. The ink composition of claim 38, wherein said ammonium ion is selected from the group consisting of ammonium, methylammonium, diethylammonium, trimethylammonium, triethylammonium, benzylammonium, piperidinium, and pyrrolidinium, and said anion is selected from the group consisting of acetate, propionate, butyrate, cyclohexanecarboxylate, benzoate, phenyl acetate, methane sulfonate, benzene sulfonate, and toluene sulfonate.

40. The ink composition of claim 22, where said ink is suitable as an ink jet ink.

41. The ink composition of claim 22, wherein said polymer is present in an amount sufficient to improve the waterfastness of an image generated from said ink composition.

42. An ink composition, comprising a pigment and a polymer selected from the group consisting of polyethyleneimine and derivatives thereof, wherein said pigment has attached at least one organic group having an ionic group, an ionizable group, or mixture thereof.

43. The ink composition of claim 42, wherein said ink composition is an aqueous ink composition.

44. The ink composition of claim 42, wherein said derivatives of polyethyleneimine are hydroxyethylated polyethyleneimine, exthoxylated PEI, hydroxypropylated polyethyleneimine, and epichlorohydrin-modified polyethyleneimine.

45. The ink composition of claim 42, wherein said polymer has a weight average molecular weight ranging from 300 to 70,000.

46. The ink composition of claim 42, wherein said polymer has a weight average molecular weight ranging from 600 to 50,000.

47. The ink composition of claim 42, wherein said pigment is a carbon black.

48. The ink composition of claim 42, wherein said pigment is a charged carbon black.

49. The ink composition of claim 42, wherein said pigment is a charged, modified carbon black having at least one attached organic group.

50. The ink composition of claim 48, wherein said charged carbon black is negatively charged.

51. The ink composition of claim 48, wherein said charged carbon black is positively charged.

52. The ink composition of claim 49, wherein said organic group of said carbon black is selected from the group consisting of $C_6H_4SO_3^-M^+$, $C_6H_4CO_2^-M^+$, $C_6H_4N(CH_3)_3^+X^-$, $C_6H_4COCH_2N(CH_3)_3^+X^-$, and $C_6H_4(NC_5H_5)^+X^-$, wherein $M^+$ is $Na^+$, $K^+$, or $Li^+$ and $X^-$ is a monovalent anion.

53. The ink composition of claim 42, wherein said pigment is a charged, finely divided carbon product.

54. The ink composition of claim 42, wherein said polymer is polyethyleneirnine and said pigment is a modified carbon black having an attached organic group, wherein said organic group is $C_6H_4SO_3^-Na^+$.

55. The ink composition of claim 42, further comprising an ammonium salt.

56. The ink composition of claim 55, wherein said ammonium salt has a positive ion selected from the group consisting of ammonium, alkyl ammonium, dialkyl ammonium, trialkyl ammonium, arylalkyl ammonium, cyclic ammonium, and cyclic alkyl ammonium, and a negative ion selected from the group consisting of alkanoate, cycloalkyl carboxylate, aromatic carboxylate, arylalkyl carboxylate, alkylaryl carboxylate, sulfonate, and anions derived from a mineral acid.

57. The ink composition of claim 56, wherein said ammonium ion is selected from the group consisting of ammonium, methylammonium, diethylammonium, trimethylammonium, triethylammonium, benzylammonium, piperidinium, and pyrrolidinium, and said anion is selected from the group consisting of acetate, propionate, butyrate, cyclohexanecarboxylate, benzoate, phenyl acetate, methane sulfonate, benzene sulfonate, and toluene sulfonate.

58. The ink composition of claim 42, where said ink is suitable as an ink jet ink.

59. The ink composition of claim 42, wherein said polymer is present in an amount sufficient to improve the waterfastness of an image generated from said ink composition.

60. A method for generating printed images which comprises the steps of: incorporating into a printing apparatus the ink composition of claim 1 and generating an image onto a substrate.

61. The method of claim 60, wherein said printing apparatus is an ink jet printing apparatus.

62. A method for generating printed images which comprises the steps of: incorporating into a printing apparatus the ink composition of claim 22 and generating an image onto a substrate.

63. The method of claim 62, wherein said printing apparatus is an ink jet printing apparatus.

64. A method for generating printed images which comprises the steps of: incorporating into a printing apparatus the ink composition of claim 42 and generating an image onto a substrate.

65. The method of claim 64, wherein said printing apparatus is an ink jet printing apparatus.

\* \* \* \* \*

UNITED STATES PATENT AND TRADEMARK OFFICE
CERTIFICATE OF CORRECTION

PATENT NO.   : 5,958,999
DATED        : September 28, 1999
INVENTORS    : Jodi A. Bates, James A. Belmont, Joseph E. Johnson, and John C. Smith It is certified that an error appears in the above-identified patent and that said Letters Patent is hereby corrected as shown below:

In claim 33, fifth line, at column 25, line 14, change "X⁻)" to --X⁻--.

Signed and Sealed this

Sixteenth Day of May, 2000

Attest:

Q. TODD DICKINSON

Attesting Officer

Director of Patents and Trademarks